United States Patent
Bach et al.

(10) Patent No.: US 11,372,631 B2
(45) Date of Patent: *Jun. 28, 2022

(54) UPDATING EXECUTABLE GRAPHS

(71) Applicant: Ab Initio Technology LLC, Lexington, MA (US)

(72) Inventors: Edward Alan Bach, Melrose, MA (US); Richard A. Shapiro, Arlington, MA (US)

(73) Assignee: Ab Initio Technology LLC, Lexington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/216,944

(22) Filed: Mar. 30, 2021

(65) Prior Publication Data

US 2021/0216290 A1 Jul. 15, 2021

Related U.S. Application Data

(63) Continuation of application No. 16/153,320, filed on Oct. 5, 2018, now Pat. No. 10,990,364.

(Continued)

(51) Int. Cl.
*G06F 8/41* (2018.01)
*G06F 8/71* (2018.01)

(52) U.S. Cl.
CPC ............ *G06F 8/433* (2013.01); *G06F 8/71* (2013.01)

(58) Field of Classification Search
CPC .................................. G06F 8/433; G06F 8/71
See application file for complete search history.

(56) References Cited

U.S. PATENT DOCUMENTS

| 5,303,379 | A | 4/1994 | Khoyi et al. |
| 5,966,072 | A | 10/1999 | Stanfill et al. |

(Continued)

FOREIGN PATENT DOCUMENTS

| CN | 102855495 | 6/2015 |
| CN | 108009497 | 5/2018 |
| CN | 109597459 | 4/2019 |

OTHER PUBLICATIONS

Nils Voss et al., "Automated Dataflow Graph Merging", Jul. 2016.
(Continued)

*Primary Examiner* — Douglas M Slachta
(74) *Attorney, Agent, or Firm* — Fish & Richardson P.C.

(57) ABSTRACT

A method for generating an updated graph based on a base graph includes identifying differences between a base graph and each of a source and a target graph. The specification of each graph defines nodes representing data processing components defining operations for processing data, and links representing flow of data. The identifying includes: comparing specifications of base and source graphs to identify a first set of differences between the base and source graph, and comparing specifications of base and target graphs to identify a second set of differences between the base and the target graph. The method includes characterizing a correspondence between the differences in the first set and the differences in the second set, determining a set of combined differences based on the correspondence and the first and second sets of differences, and generating the updated graph based on the base graph and the set of combined differences.

23 Claims, 15 Drawing Sheets

Related U.S. Application Data

(60) Provisional application No. 62/681,395, filed on Jun. 6, 2018.

(56) References Cited

U.S. PATENT DOCUMENTS

| | | | |
|---|---|---|---|
| 5,974,254 A * | 10/1999 | Hsu | G06F 8/34 717/109 |
| 7,085,779 B2 | 8/2006 | Holtz et al. | |
| 7,165,248 B2 * | 1/2007 | Holtz | G06F 16/1787 707/999.001 |
| 7,506,304 B2 | 3/2009 | Morrow | |
| 8,151,244 B2 * | 4/2012 | Hsu | G06F 8/34 717/113 |
| 8,583,613 B2 | 11/2013 | Liu et al. | |
| 9,063,742 B1 * | 6/2015 | Bienkowski | G06F 8/71 |
| 9,442,707 B2 | 9/2016 | Sathyanathan | |
| 9,471,304 B1 * | 10/2016 | Fuchs | G06F 8/71 |
| 9,785,419 B2 * | 10/2017 | Stanfill | G06F 9/44521 |
| 9,996,342 B2 * | 6/2018 | Mak | G06F 8/71 |
| 10,175,951 B2 | 1/2019 | Stanfill et al. | |
| 10,180,821 B2 | 1/2019 | Larson et al. | |
| 10,303,469 B1 * | 5/2019 | Neatherway | G06F 16/9024 |
| 10,802,945 B2 | 10/2020 | Rozenberg et al. | |
| 10,990,364 B2 * | 4/2021 | Bach | G06F 8/433 |
| 2003/0084425 A1 | 5/2003 | Glaser | |
| 2004/0034696 A1 * | 2/2004 | Joffrain | G06F 8/70 709/217 |
| 2006/0190105 A1 * | 8/2006 | Hsu | G06F 8/34 700/86 |
| 2007/0006152 A1 | 1/2007 | Ahmed et al. | |
| 2007/0011668 A1 | 1/2007 | Wholey et al. | |
| 2007/0283321 A1 | 12/2007 | Hegde | |
| 2008/0168071 A1 | 7/2008 | Dykes et al. | |
| 2009/0055445 A1 * | 2/2009 | Liu | G06F 16/258 707/999.203 |
| 2013/0157579 A1 | 6/2013 | Rozenberg | |
| 2014/0237447 A1 | 8/2014 | Santos | |
| 2016/0162363 A1 * | 6/2016 | Letkeman | G06F 16/1858 707/641 |
| 2017/0228411 A1 | 8/2017 | Cadarette | |
| 2018/0107764 A1 | 4/2018 | Bowman | |
| 2018/0157579 A1 | 6/2018 | Rozenberg | |
| 2018/0336020 A1 | 11/2018 | Berg et al. | |
| 2019/0303135 A1 * | 10/2019 | Li | G06F 8/658 |

OTHER PUBLICATIONS

Office Action in Chinese Appln. No. 201980038088.7, dated Sep. 23, 2021, 6 pages (with English translation).

PCT International Preliminary Report on Patentability in International Appln. No. PCT/US2019/035296, dated Dec. 8, 2020, 13 pages.

PCT International Search Report and Written Opinion in International Appln. No. PCT/US2019/035296, dated Sep. 27, 2019, 20 pages.

Pro Git, Apress, Aug. 26, 2009, Chapter 3, 31 pages.

Taentzer, "A fundamental approach to model versioning based on graph modifications: from theory to implementation", Software Systems and Modeling, Feb. 2014, 13(1):239-272.

Wingerd "Convergence vs. Divergence Convergence vs. Divergence Purposeful Merging with Perforce", European User Conference, Sep. 2006, 24 pages.

\* cited by examiner

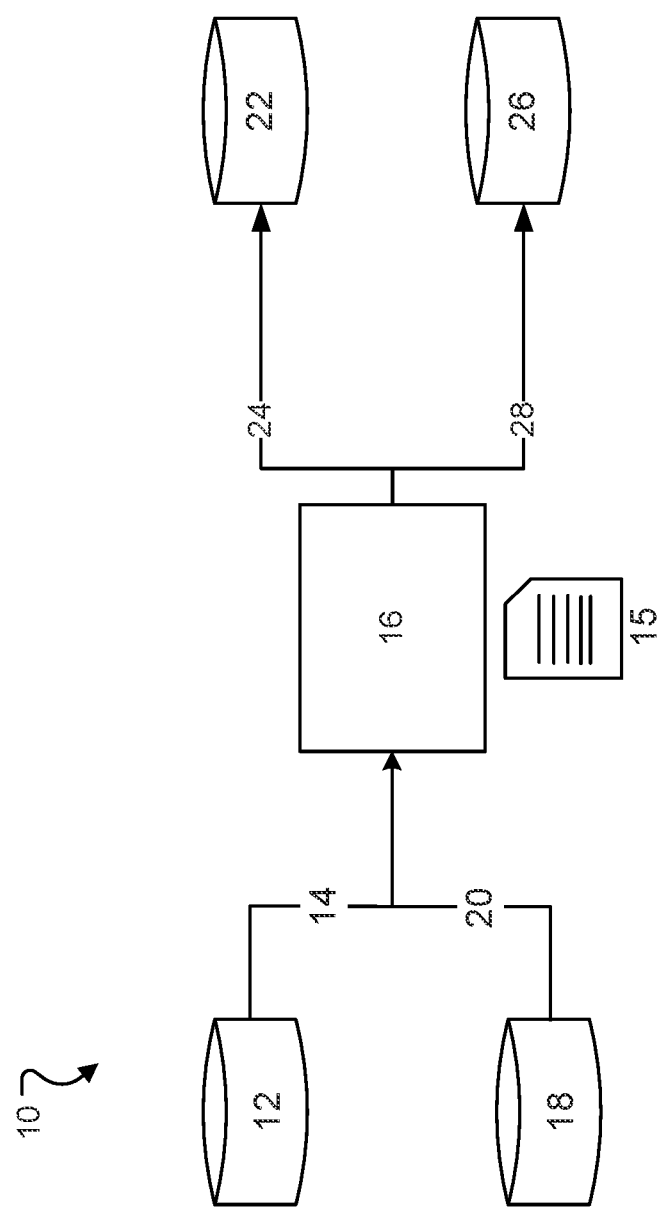

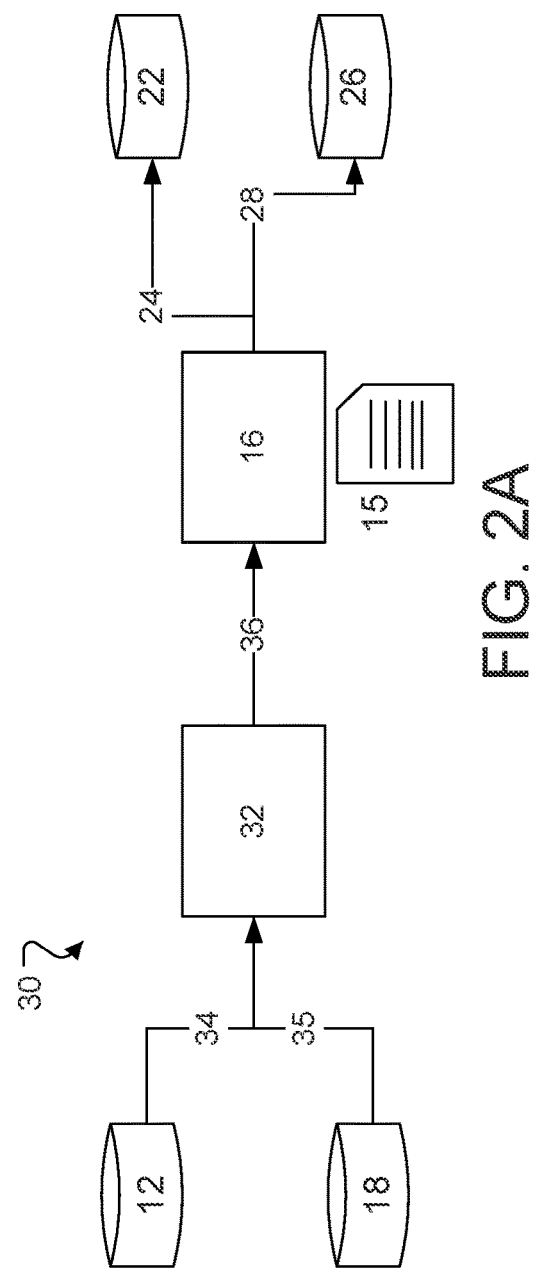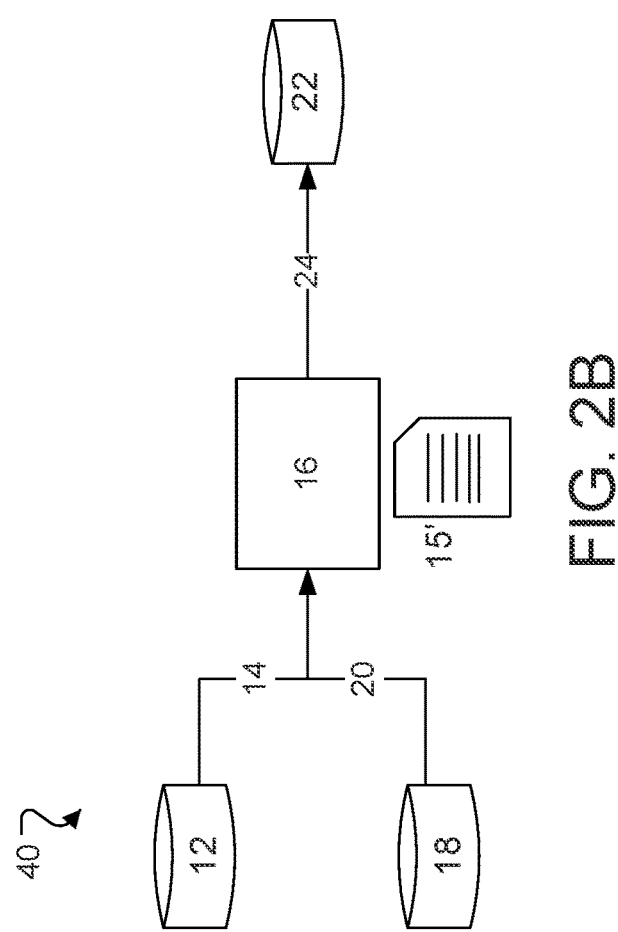

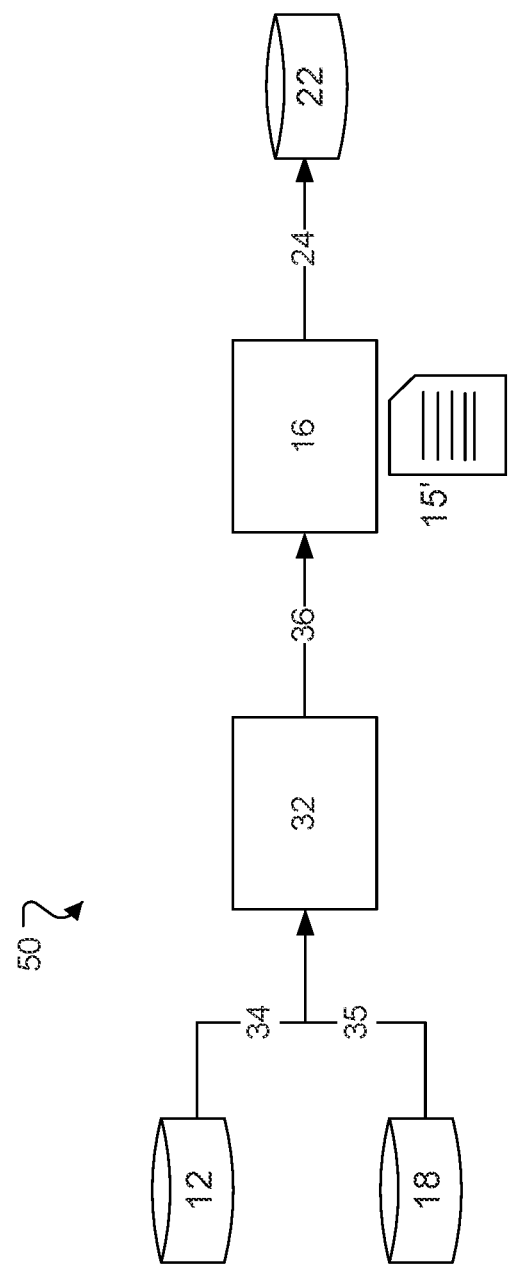

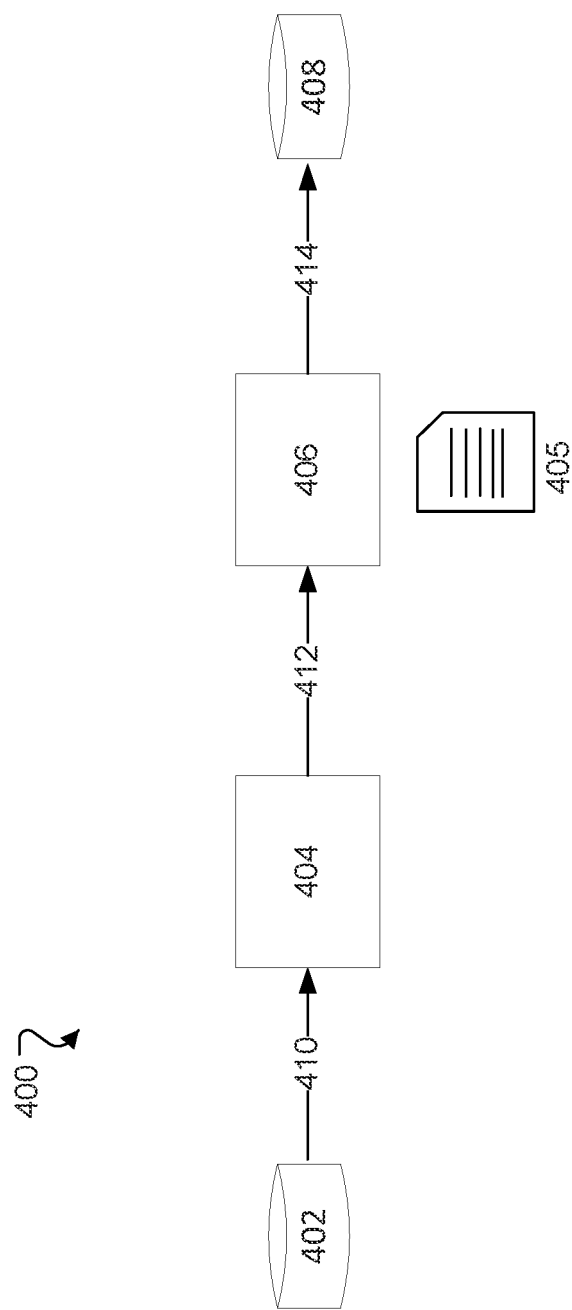

```
Reformat.transform0:
<<<<<< Source
out . balance:: if (in.customer_id=="4484401") in.balance + 400.00 else in.balance;
    Base
out . balance:: if (in.customer_id=="4484401") in.balance + 200.00 else in.balance;
======
out . balance:: in.balance;
>>>>>> Target
```

FIG. 8

UPDATING EXECUTABLE GRAPHS

CLAIM OF PRIORITY

This application is a continuation of U.S. patent application Ser. No. 16/153,320, filed on Oct. 5, 2018, which claims priority to U.S. Patent Application Ser. No. 62/681,395, filed on Jun. 6, 2018, the entire contents of both of which are incorporated here by reference.

BACKGROUND

During development or execution of a computer program, changes can be made to the computer program. Sometimes, one developer or team of developers can make changes to the computer program independently from the changes made by another developer or team of developers.

SUMMARY

In an aspect, a method for generating an updated dataflow graph based on a base graph includes identifying differences between a first dataflow graph and each of a second dataflow graph and a third dataflow graph. The first dataflow graph includes the base graph, the second dataflow graph includes a source graph, and the third dataflow graph includes a target graph. The specification of each of the dataflow graphs defines nodes, at least one of the nodes representing a data processing component defining an operation to be performed to process data provided to the data processing component, and one or more links connecting the nodes and each representing a flow of data. The identifying includes: comparing a specification of the base graph and a specification of the source graph to identify a first set of differences between the base graph and the source graph, the first set of differences including information indicative of one or more of a first deleted node, a first deleted link, a first added node, a first added link, a first modified node, or a first modified link, and comparing a specification of the base graph and a specification of the target graph to identify a second set of differences between the base graph and the target graph, the second set of differences including information indicative of one or more of a second deleted node, a second deleted link, a second added node, a second added link, a second modified node, or a second modified link. The method includes characterizing a correspondence between the differences in the first set of differences and the differences in the second set of differences, including identifying one or more of (i) a node or link identified in the first set of differences that corresponds to a node or link identified in the second set of differences, (ii) a node or link identified in the first set of differences that does not correspond to any node or link identified in the second set of differences, or (iii) a node or link identified in the second set of differences that does not correspond to any node or link identified in the first set of differences. The method includes determining a set of combined differences based on the characterized correspondence, the first set of differences between the base graph and the source graph, and the second set of differences between the base graph and the target graph. The method includes generating the updated dataflow graph based on the base graph and the set of combined differences.

Embodiments can include one or more of the following features.

In a first feature, combinable with any one or more of the preceding features, the source graph, the base graph, the target graph, and the updated dataflow graph are executable dataflow graphs.

In a second feature, combinable with any one or more of the preceding features, the source graph is a first modified version of the base graph, and in which the target graph is a second modified version of the base graph In a third feature, combinable with any one or more of the preceding features, the method includes generating the first set of differences and the second set of differences. Each set of differences including, for each difference in the set: information identifying a type of the difference, and one or more of (i) information indicative of one or more nodes associated with the difference or (ii) information indicative of one or more links associated with the difference.

In a fourth feature, combinable with the third feature, the type of the difference includes one or more of a deletion, an addition, or a modification.

In a fifth feature, combinable with the third or fourth feature, the information indicative of one or more nodes associated with the difference includes (i) information identifying a deleted, added, or modified node and one or more of (ii) information identifying a node upstream of the deleted, added, or modified node and (iii) information identifying a node downstream of the deleted, added, or modified node.

In a sixth feature, combinable with any of the third through fifth features, the information indicative of one or more links associated with the difference includes one or more of (i) information identifying an added link and (ii) information identifying a deleted link.

In a seventh feature, combinable with any of the preceding features, generating the set of combined differences includes including, in the set of combined differences, information indicative of the node or link identified in the first set of differences that does not correspond to any node or link identified in the second set of differences.

In an eighth feature, combinable with any of the preceding features, the method includes generating the set of combined differences includes including, in the set of combined differences, information indicative the node or link identified in the second set of differences that does not correspond to any node or link identified in the first set of differences.

In a ninth feature, combinable with any of the preceding features, the method includes determining a compatibility between the node or link identified in the first set of differences and the corresponding node or link identified in the second set of differences.

In a tenth feature, combinable with the ninth feature, the node or link identified in the first set of differences includes a first modified node or link and the node or link identified in the second set of differences includes a second modified node or link. Determining a compatibility includes: determining that a modification associated with the first modified node or link is compatible with a modification associated with the second modified node or link; and including, in the set of combined differences, information indicative of both the node or link identified in the first set of differences and the node or link identified in the second set of differences.

In an eleventh feature, combinable with the ninth or tenth feature, the node or link identified in the first set of differences includes a first modified node or link and the node or link identified in the second set of differences includes a second modified node or link. Determining a compatibility includes: determining that a modification associated with the first modified node or link is compatible with a modification associated with the second modified node or link; selecting the first modified node or link, the second modified node or link, or neither; and including information indicative of the selected node or link in the set of combined differences.

In a twelfth feature, combinable with any of the preceding features, determining the set of combined differences includes: for a pair of differences determined to be corresponding, determining that the differences are compatible; and including information indicative of both differences of the pair in the set of combined differences.

In a thirteenth feature, combinable with any of the preceding features, determining the set of combined differences includes: for a pair of differences determined to be corresponding, determining that the differences are conflicting; selecting one of the differences of the pair; and including information indicative of the selected difference in the set of combined differences.

In a fourteenth feature, combinable with the thirteenth feature, the method includes selecting one of the differences based on a selection criterion.

In a fifteenth feature, combinable with the thirteenth or fourteenth feature, the method includes presenting, on a user interface, information indicative of the both differences of the pair; and selecting the one of the differences based on user input.

In a sixteenth feature, combinable with any of the preceding features, generating the updated dataflow graph includes: generating a copy of the base graph; and applying each difference in the set of combined differences to the copy.

In a seventeenth feature, combinable with any of the preceding features, comparing a specification of the base graph and a specification of the source graph includes determining a correspondence between the base graph and the source graph.

In an eighteenth feature, combinable with the seventeenth feature, determining a correspondence between the base graph and the source graph includes one or more of (1) identifying a first node or link of the base graph that corresponds to a node or link of the source graph, (2) identifying a second node or link of the base graph that does not correspond to any node of the source graph, and (3) identifying a third node or link of the source graph that does not correspond to any node or link of the base graph.

In a nineteenth feature, combinable with the eighteenth feature, identifying a first set of differences between the base graph and the source graph includes identifying a difference between the first node or link of the base graph and the corresponding node or link of the source graph.

In a twentieth feature, combinable with the nineteenth feature, identifying a difference between the first node or link and the corresponding node or link of the source graph includes identifying a difference between one or more of a parameter and an expression for a parameter of the first node or link and a parameter or an expression for a parameter of the corresponding first node or link.

In a twenty-first feature, combinable with any of the preceding features, the base graph contains a base subgraph and in which the source graph contains a first subgraph. The method includes comparing a specification of the base subgraph and a specification of the first subgraph to identify one or more differences between the base subgraph and the first subgraph.

In a twenty-second feature, combinable with any of the preceding features, the first dataflow graph is the base graph, the second dataflow graph is the a source graph, and the third dataflow graph is the a target graph.

In a twenty-third feature, combinable with any of the preceding features, the links represent flows of data between nodes.

In a twenty-fourth feature, combinable with any of the preceding features, the links represent flows of control signals between nodes.

In a twenty-fifth feature, combinable with any of the preceding features, the base graph, the source graph, and the target graph include data processing graphs.

In a twenty-sixth feature, combinable with any of the preceding features, the base graph, the source graph, and the target graph include control graphs.

In a twenty-seventh feature, combinable with any of the preceding features, the base graph, the source graph, and the target graph include plans.

In a twenty-eighth feature, combinable with any of the preceding features, the determining of the correspondence between the differences includes: identifying (1) differences that involve nodes or links that are identified in only one of the first and second sets of differences and (2) differences that involve nodes or links that are identified in both of the first and second sets of differences In a twenty-ninth feature, combinable with any of the preceding features, the determining of the set of combined differences includes: for each difference of the first and second sets of differences that involves a node or a link that is identified in only one of the first and second sets of differences, information indicative of that difference is added to the set of combined differences, and for each difference of the first and second sets of differences that involves a node or a link that is identified in both of the first and second sets of differences, a compatibility analysis is performed.

In a thirtieth feature, combinable with the twenty-ninth feature, the performing of the compatibility analysis includes: determining whether or not a first difference is conflicting with a second difference, wherein a pair of conflicting differences are conflicting if application of one of the pair of conflicting differences to the base executable graph would prevent application of the other one of the pair of conflicting differences to the base executable graph.

In a thirty-first feature, combinable with the thirtieth feature, the method includes, in case of any pair of conflicting differences, resolving the conflict of the pair of conflicting differences by selecting one of the pair of conflicting differences according to a selection criterion, and adding information indicative of the selected difference the set of combined differences.

In a thirty-second feature, combinable with the thirtieth or thirty-first feature, the method includes providing a graphical user interface; and displaying, via the graphical user interface, information visually representing the pair of conflicting differences.

In a thirty-third feature, combinable with the thirty-second feature, the method includes displaying, via the graphical user interface, one or more visual representations of one or more selections of a difference among the pair of conflicting differences and a visual representation of the respective updated dataflow graph that would result from the respective selections.

In a thirty-fourth feature, combinable with the thirty-third feature, the method includes receiving, from a user and via the graphical user interface, an input including a selection of one of the visual representations the suggested one or more selections, wherein the selection criterion is defined by the input.

In an aspect, a non-transitory computer readable medium stores instructions for causing a computing system to generate an updated dataflow graph based on a base graph. The instructions include instructions for causing the computing system to identify differences between a first dataflow graph and each of a second dataflow graph and a third dataflow graph, wherein the first dataflow graph includes the base graph, the second dataflow graph includes a source graph, and the third dataflow graph includes a target graph. The specification of each of the dataflow graphs defines nodes, at least one of the nodes representing a data processing component defining an operation to be performed to process data provided to the data processing component, and one or more links connecting the nodes and each representing a flow of data. The identifying includes: comparing a specification of the base graph and a specification of the source graph to identify a first set of differences between the base graph and the source graph, the first set of differences including information indicative of one or more of a first deleted node, a first deleted link, a first added node, a first added link, a first modified node, or a first modified link, and comparing a specification of the base graph and a specification of the target graph to identify a second set of differences between the base graph and the target graph, the second set of differences including information indicative of one or more of a second deleted node, a second deleted link, a second added node, a second added link, a second modified node, or a second modified link. The instructions include instructions for causing the computing system to characterize a correspondence between the differences in the first set of differences and the differences in the second set of differences, including identifying one or more of (i) a node or link identified in the first set of differences that corresponds to a node or link identified in the second set of differences, (ii) a node or link identified in the first set of differences that does not correspond to any node or link identified in the second set of differences, or (iii) a node or link identified in the second set of differences that does not correspond to any node or link identified in the first set of differences. The instructions include instructions for causing the computing system to determine a set of combined differences based on the characterized correspondence, the first set of differences between the base graph and the source graph, and the second set of differences between the base graph and the target graph; and generate the updated dataflow graph based on the base graph and the set of combined differences.

In an aspect, a computing system for generating an updated dataflow graph based on a base graph includes one or more processors coupled to a memory. The one or more processors and memory are configured to identify differences between a first dataflow graph and each of a second dataflow graph and a third dataflow graph, wherein the first dataflow graph includes the base graph, the second dataflow graph includes a source graph, and the third dataflow graph includes a target graph. The specification of each of the dataflow graphs defines nodes, at least one of the nodes representing a data processing component defining an operation to be performed to process data provided to the data processing component, and one or more links connecting the nodes and each representing a flow of data. The identifying includes: comparing a specification of the base graph and a specification of the source graph to identify a first set of differences between the base graph and the source graph, the first set of differences including information indicative of one or more of a first deleted node, a first deleted link, a first added node, a first added link, a first modified node, or a first modified link, and comparing a specification of the base graph and a specification of the target graph to identify a second set of differences between the base graph and the target graph, the second set of differences including information indicative of one or more of a second deleted node, a second deleted link, a second added node, a second added link, a second modified node, or a second modified link. The one or more processors and memory are configured to characterize a correspondence between the differences in the first set of differences and the differences in the second set of differences, including identifying one or more of (i) a node or link identified in the first set of differences that corresponds to a node or link identified in the second set of differences, (ii) a node or link identified in the first set of differences that does not correspond to any node or link identified in the second set of differences, or (iii) a node or link identified in the second set of differences that does not correspond to any node or link identified in the first set of differences. The one or more processors and memory are configured to determine a set of combined differences based on the characterized correspondence, the first set of differences between the base graph and the source graph, and the second set of differences between the base graph and the target graph; and generate the updated dataflow graph based on the base graph and the set of combined differences.

In an aspect, a computing system for generating an updated dataflow graph based on a base graph includes means for identifying differences between a first dataflow graph and each of a second dataflow graph and a third dataflow graph, wherein the first dataflow graph includes a base graph, the second dataflow graph includes a source graph, and the third dataflow graph includes a target graph. The specification of each of the dataflow graphs defines nodes, at least one of the nodes representing a data processing component defining an operation to be performed to process data provided to the data processing component, and one or more links connecting the nodes and each representing a flow of data. The identifying includes: comparing a specification of the base graph and a specification of the source graph to identify a first set of differences between the base graph and the source graph, the first set of differences including information indicative of one or more of a first deleted node, a first deleted link, a first added node, a first added link, a first modified node, or a first modified link, and comparing a specification of the base graph and a specification of the target graph to identify a second set of differences between the base graph and the target graph, the second set of differences including information indicative of one or more of a second deleted node, a second deleted link, a second added node, a second added link, a second modified node, or a second modified link. The computing system includes means for characterizing a correspondence between the differences in the first set of differences and the differences in the second set of differences, including identifying one or more of (i) a node or link identified in the first set of differences that corresponds to a node or link identified in the second set of differences, (ii) a node or link identified in the first set of differences that does not correspond to any node or link identified in the second set of differences, or (iii) a node or link identified in the second set of differences that does not correspond to any node or link identified in the first set of differences. The computing system includes means for determining a set of combined differences based on the characterized correspondence, the first set of differences between the base graph and the source graph, and the second set of differences between the base graph and the target graph. The computing system includes means for generating the updated dataflow graph based on the base graph and the set of combined differences.

The approaches described here enable efficient and reliable automated merging of multiple versions of a dataflow graph (i.e., a computer program) into a single, updated dataflow graph that reflects the changes in each of the versions. This automated merge can be used, e.g., to efficiently and reliably combine development or debugging work on the computer program performed independently by each of multiple teams into a single, updated computer program. This efficient and reliable version management assists program developers during the process of software development and hence also makes this development process more efficient and precise.

BRIEF DESCRIPTION OF DRAWINGS

FIG. 1 is a graphical representation of a dataflow graph.

FIGS. 2A-2C are graphical representations of dataflow graphs.

FIGS. 4A-4D are graphical representations of dataflow graphs.

FIGS. 6-9 are screenshots.

DETAILED DESCRIPTION

Figure 3:
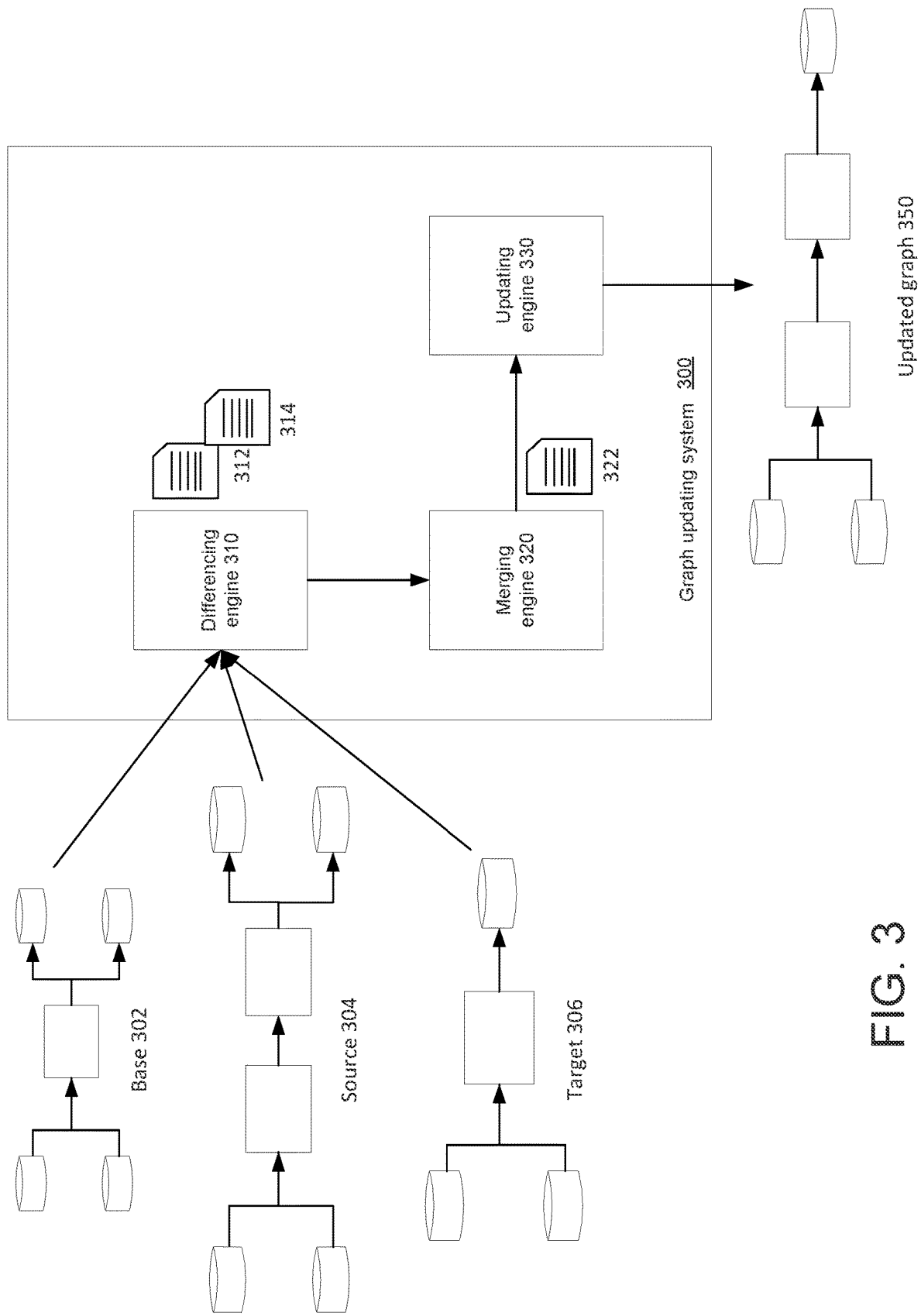
FIG. 3 is a system diagram.

We describe here an approach to combining multiple versions of a computer program into a single, updated program. For instance, when developing or debugging a computer program, such as a dataflow graph, e.g., a data processing graph, a control graph, or a plan, multiple developers or sets of developers may each work on the computer program independently. As a result, multiple modified versions of the computer program may be generated. The differences between the base computer program and each of these modified versions of the base computer program can be identified and a complete set of all of the differences can be applied to the base computer program to generate a single, updated computer program that reflects the changes made in each of the modified versions of the base computer program.

A dataflow graph is a graphical representation of a computer program that can include nodes representative of data processing components and datasets, such as data sources and data sinks. Datasets can be, for example, files, database tables, or other types of data sources or sinks that can provide data (e.g., data records) for processing by the graph or receive data processed by the graph. Data processing components and datasets are sometimes collectively referred to as nodes of the graph. A link connecting two nodes of a graph represents a flow of information, such as data or control signals, between the first node and the second node. Such dataflow graphs (sometimes referred to as graphs) can be data processing graphs, control graphs, or plans. In some examples, dataflow graphs can be capable of being executed to carry out processing of the information. In some examples, a dataflow graph is not executable, e.g., a dataflow graph that is a representation of a computer program that is still undergoing development or debugging. FIG. 1 shows a dataflow graph 10 that is configured to process data and that includes data sources 12, 18 each connected by a respective link 14, 20 to a filter node 16. The filter node 16 is connected by links 24, 28 to data sinks 22, 26, respectively.

The nodes of a graph can have input ports and/or output ports to which links can be connected. In the example of FIG. 1, the upstream ends of the links 14, 20 are connected to an output port of the corresponding data source 12, 18. The upstream end of the link 24 is connected to an output port of the filter node 16. The downstream ends of the links 14, 20 are connected to an input port of the filter node 16. The downstream end of the links 24, 28 is connected to an input port of the corresponding data sink 22, 26.

Data processing components execute operations to process or manipulate data. A node is a graphical representation of a data processing component (e.g. a combination of software and hardware) that is an object defined by programming code that, when executed, implements the operation of the data processing component. Examples of data processing components include mapping components, filter components, deduplication components, aggregation components, replicate components, normalization components, partition and sort components, join components, or other types of data processing components. In some examples, data source and data sink components can be considered data processing components. The operation of a data processing component can be defined with respect to one or more parameters. The parameters can be defined in a file (e.g., a .dml file) that is referenced by the code of the data processing component. For instance, the file can include values or expressions for parameters associated with the data processing component. When the graph is instantiated (e.g., at runtime), expressions for the parameters are evaluated to obtain values for the parameters, sometimes referred to as resolving the parameters. Parameter values or expressions can be defined, for example, by a user over a user interface (e.g., in response to a prompt), defined from a file, or defined in terms of another parameter in the same context or in a different context. For example, a parameter can be exported from a different context (e.g., a parameter evaluated in the context of a different component) by designating the parameter to have a "same as" relationship to another parameter. In the example of FIG. 1, the filter node 16 and its corresponding component have an associated parameter set 15.

We refer to the initial, unmodified dataflow graph as the base executable graph, or as the base graph. A first modified version of the graph that has been modified relative to the base graph is referred to as the source executable graph, or as the source graph. A second modified version of the graph that has been modified relative to the base graph is referred to as the target executable graph, or as the target graph. The graph that incorporates the changes from both the source executable graph and the target executable graph is referred to as the updated dataflow graph.

A differencing analysis is performed on each of the source graph and the target graph to identify a corresponding set of differences between the base graph and the source and target graphs, respectively. The result of the differencing analysis is multiple sets of differences, each indicative of the differences between the base graph and one of the source graph and the target graph. The multiple sets of differences are merged into a single, set of combined differences. The set of combined differences is applied to the base graph to generate the updated graph. This contributes to providing the efficient and reliable version management mentioned above.

In an example, the dataflow graph 10 of FIG. 1 is the base graph. FIGS. 2A and 2B show a source graph 30 and a target graph 40, respectively. A differencing analysis is performed for each of the source graph 30 and the target graph 40 to identify the differences between the base graph 10 and each graph 30, 40. A differencing analysis of a first graph and a second graph (e.g., the base graph 10 and the source graph 30) identifies nodes present in the source graph 30 but not in the base graph 10 (referred to as added nodes), one or more nodes present in the base graph 10 but not in the source graph 30 (referred to as deleted nodes), and one or more nodes present in both the base graph 10 and the source graph 30 but having been modified (referred to as modified nodes). A modified node can be generally similar between the first graph and the second graph, but with changes to parameters, attributes, or other features associated with the node, as discussed further below. A differencing analysis can also identify differences between one or more links of the first graph and one or more links of the second graph. Additional description of differencing analyses is provided below.

In the example of FIGS. 2A and 2B, the differencing analysis for the source graph 30 results in a first set of differences identifying an added node 32, added flows 34, 35, 36, and deleted flows 14, 20. The differencing analysis for the target graph 40 results in a second set of differences identifying a modified node 16 having a changed parameter set 15', a deleted node 26, and a deleted link 28.

The multiple sets of differences are joined into a single set of combined differences, described in more detail below. In the example of FIGS. 2A and 2B, the set of combined differences identifies the added node 32, the deleted node 26, the modified node 16, and the added and deleted flows. Referring also to FIG. 2C, the set of combined differences is applied to the base graph 10 (or a copy thereof) to generate an updated graph 50. The updated graph 50 includes the nodes and links of the base graph 10, modified according to the set of combined differences. That is, nodes and links added in any one of the source and target graphs compared to the base graph are added compared to the base graph (i.e. generated) in the updated graph. Nodes and links deleted in any one of the source and target graphs compared to the base graph are deleted compared to the base graph (i.e. not generated) in the updated graph.

Referring to FIG. 3, a graph updating system 300 identifies the differences between a base graph 302 and each of a source graph 304 and a target graph 306 and generates a single, updated graph 350 that reflects the changes made in both graphs 304, 306 relative to the base graph 302. The graph updating system 300 includes a differencing engine 310 that performs a differencing analysis for each of the source graph 304 and the target graph 306 and outputs a set of differences 312, 314 corresponding to each graph 304, 306. Each set of differences identifies the differences between the base graph 302 and the corresponding graph 304, 306. The graph updating system 300 also includes a merging engine 320 that merges the multiple sets of differences 312, 314 into a single, set of combined differences 322. A graph updating engine 330 generates the updated graph 350 based on the base graph 302 and the set of combined differences 322.

A differencing analysis identifies, for a given graph (e.g., source graph or target graph), nodes in the base graph 302 that have been deleted in the source or target graph, nodes that have been added to the source or target graph, and nodes that have been modified in the source or target graph. In some examples, the differencing analysis can also analyze links to identify deleted links, added links, and modified links. The differencing engine 310 compares the specification of the base graph 302 to the specification of each of the source graph and the target graph to determine which nodes (e.g., nodes corresponding to data processing components, input datasets or output datasets) in the base graph 302 correspond to nodes in each of the source graph and the target graph. The specification of a graph is a file that is separate from the graph and that defines the elements of the graph, such as the nodes and links of the graph.

Corresponding nodes are nodes that somehow involved in both the base graph and the source or target graph but are not necessarily identical and can have differences between the base graph and the source or target graph, but are generally similar enough to be regarded as the same node in both graphs (such as nodes with different associated parameter sets but otherwise identical). In some examples, the differencing engine 310 identifies corresponding nodes based on metadata associated with the nodes, such as one or more of the type of node (e.g., a data processing component or a dataset), a name of the node, a unique identifier of the node, or other metadata associated with the node. In some examples, the differencing engine 310 identifies corresponding nodes based on information associated with data flow into or out of the nodes or components, such as the names or number of ports, the names or sources of data flows into the nodes, the names or destinations of data flows out of the nodes or components, or other information associated with data flow into or out of the nodes or components. In some examples, the differencing engine 310 identifies corresponding nodes based on topological information, such as where a particular node is positioned in the graph relative to other nodes (e.g., which node or nodes are directly upstream or downstream of the particular node). In some examples, the differencing engine 310 identifies corresponding nodes based on the location (e.g., x-y coordinates) of the nodes in a graphical representation of the graphs on a canvas. In some examples, the differencing engine 310 disregards location information in identifying corresponding nodes, e.g., because the location of a node on a canvas may have no effect on the functionality of the node or of the graph containing the node.

In a differencing analysis for a given graph (e.g., the source graph 304 or the target graph 306), any node in the base graph 302 for which there is no corresponding node in the source graph 304 or the target graph 306 is identified by the differencing engine 310 as a deleted node in the set of differences for that graph. Any node in the source graph 304 or the target graph 306 for which there is no corresponding node in the base graph 302 is identified by the differencing engine 310 as an added node in the set of differences for that graph.

Pairs of corresponding nodes are further analyzed by the differencing engine 310 to determine whether the node in the source graph 304 or target graph 306 has any differences relative to the corresponding node in the base graph 302. If a difference is identified, the node is identified by the differencing engine 310 as a modified node. In some examples, the differencing engine 310 can analyze both features of a node that can affect the execution of a graph and features of a node that do not affect the execution of a graph. Features that affect the execution of a graph can include, for instance, parameters, such as parameter expressions or parameter values. Features that do not affect the execution of a graph can include, for instance, attribute values (e.g., author attributes, name attributes, version attributes, or other attributes), comments, legends, formats (e.g., fonts), the location of a node on a canvas, or other features. In some examples, the differencing engine 310 can analyze only features that can affect the execution of a graph and can disregard features that do not affect the execution of the graph.

An analysis of parameters of pairs of corresponding nodes can identify whether any parameters were added (for instance, a parameter that is present in the node of the source or target graph but not present in the corresponding node of the base graph) or removed (for instance, a parameter that is present in the node of the base graph but not present in the corresponding node of the source or target graph). An analysis of parameters can include an analysis of expressions defining the parameters, values of the parameters, or both. To analyze the expressions for parameters, the parameter analysis can be performed on the source code corresponding to each node.

In some examples, a differencing analysis can also include an analysis of external files referenced by the base graph and the source or target graph. In some examples, only certain types of files are analyzed by the differencing engine 310, such as record format files (e.g., .dml files), transform files (e.g., .xfr files), or other types of files the contents of which can affect execution of the graphs. Other files, such as files providing data for processing by the graphs or plans, are not considered.

The result of a differencing analysis between the base graph and a source or target graph is a set of differences (e.g., sets 312, 314) that includes information indicative of each of the differences (e.g., each of the node deletions, node additions, and node modifications). The information indicative of a deleted node can include one or more or all of the following:

Information identifying the node in the base graph (e.g., a unique identifier of the node) and indicative of the deletion of the node;
Information identifying a node upstream of the node in the base graph;
Information identifying a node downstream of the node in the base graph;
Information identifying an input flow from an upstream node into the node in the base graph and indicative of the deletion of the input link;
Information identifying an output link from the node in the base graph into a downstream node and indicative of the deletion of the link; and
Information identifying a flow connecting the upstream node to the downstream node in the source or target graph and indicative of the addition of the link.

The information indicative of an added node can include one or more or all of the following:

Information indicative of the functionality of the node (e.g., a specification of the node, a parameter set for the node, or other information indicative of node functionality);
Information identifying a node upstream of the added node in the source or target graph;
Information identifying a node downstream of the added node in the source or target graph;
Information identifying a link from the upstream node to the added node in the source or target graph and indicative of the addition of the link;
Information identifying a link from the added node to the downstream node in the source or target graph and indicative of the addition of the link; and
Information identifying a link from the upstream node to the downstream node in the base graph and indicative of the deletion of the link.

The information indicative of a modified node can include one or more or all of the following:

Information identifying the node; and
Information indicative of the modification to the node (e.g., an updated parameter list).

Additional description of differencing analyses is provided in U.S. application Ser. No. 15/587,987, filed on May 5, 2017, the contents of which are incorporated here by reference in their entirety.

The merging engine 320 merges the multiple sets of differences 312, 314 into the set of combined differences 322. To do so, the merging engine 320 determines a correspondence between the sets of differences 312, 314 to identify (1) differences that involve nodes that are identified in only one of the sets of differences and (2) differences that involve nodes that are identified in two or more of the multiple sets of differences. A difference involving a particular node means a difference for which the information indicative of the difference identifies the particular node, e.g., as a deleted node, an added node, a modified node, an upstream node, or a downstream node. For each difference involving nodes that are identified in only one of the sets of differences, the information indicative of that difference is added to the set of combined differences 322. For each difference involving nodes that are identified in two or more sets of differences, the merging engine 320 performs a compatibility analysis.

The compatibility analysis is an analysis that determines whether a first difference is conflicting or compatible with a second difference. A pair of differences are referred to as a pair of conflicts if application of a one of the differences to the copy of the base graph would prevent application of the other one of the differences to the copy. One example of a pair of conflicts is the deletion of a filter component and a change to a parameter of that same filter component. Another example of a pair of conflicts is the deletion of a reformat component and the addition of a data source connected to that reformat component by a flow. Another example of a pair of conflicts is a first change to a parameter of a component and a second, different change to that same parameter of the component.

The merging engine 320 resolves each pair of conflicts by selecting one of the pair of differences. The information indicative of the selected difference is added to the set of combined differences 322. In some examples, the merging engine 320 resolves each pair of differences with reference to a selection criterion 324, e.g., an instruction provided by a user for how to resolve conflicts. For instance, the selection criterion may specify a priority order for the multiple sets of differences and indicate that the merging engine 320 is to select the difference from the higher priority set of differences. In some examples, the merging engine 320 causes the pairs of conflicts to be displayed on a user interface 340 such that a user can manually select a difference from each pair of conflicts.

In some examples, the pairs of conflicts can be presented to a user as textual information, e.g., as a list. In some examples, the pairs of conflicts can be presented to a user using a graphical representation of each of the differences, e.g., as described in U.S. application Ser. No. 15/587,987, filed on May 5, 2017, the contents of which are incorporated here by reference in their entirety.

The graph updating engine 330 generates the updated graph 350 based on the differences in the set of combined differences 322. For instance, the graph updating engine 330 can generate a copy of the base graph 302 and apply the differences in the set of combined differences 322 to the copy. For each difference, the set of combined differences 322 identifies one or more changes to be made, including addition or deletion of links and addition, deletion, or modification of nodes. The graph updating engine 330 applies each of these changes to the copy. The copy with all changes applied is the updated graph 350.

In some examples, the set of combined differences can include only those differences that are compatible, and the updated graph 350 thus reflects only compatible differences.

Once the conflicting pairs of differences are resolved, the resolved differences can also be applied to the updated graph.

Figure 4B:
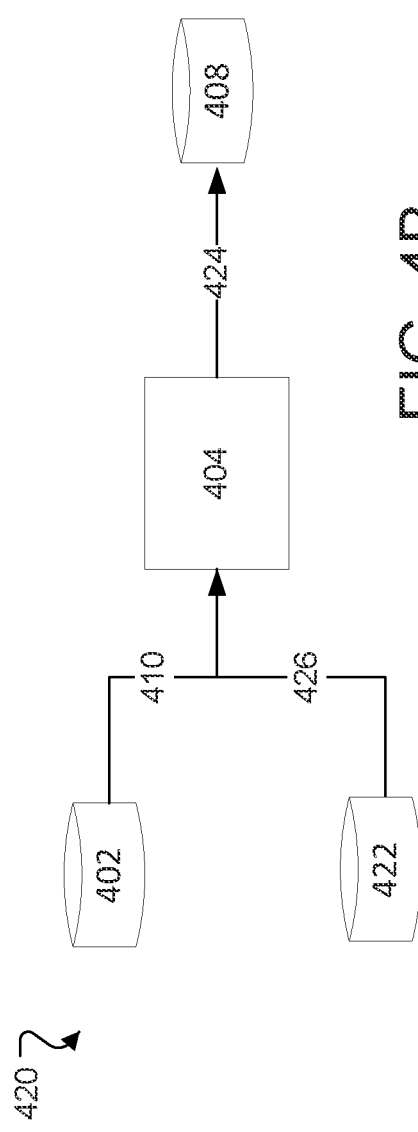

Referring to FIGS. 4A-4D, an example of merging differences is shown. FIG. 4A shows a base graph 400 for processing bank transaction records. The base graph 400 has a data source 402, a reformat node 404, a filter node 406, and a data sink 408. The filter node 406 is associated with a parameter set 405 that includes a filter by parameter identifying the transaction amount field. The nodes are connected via links 410, 412, 416, as shown in FIG. 4A.

Figure 4C:
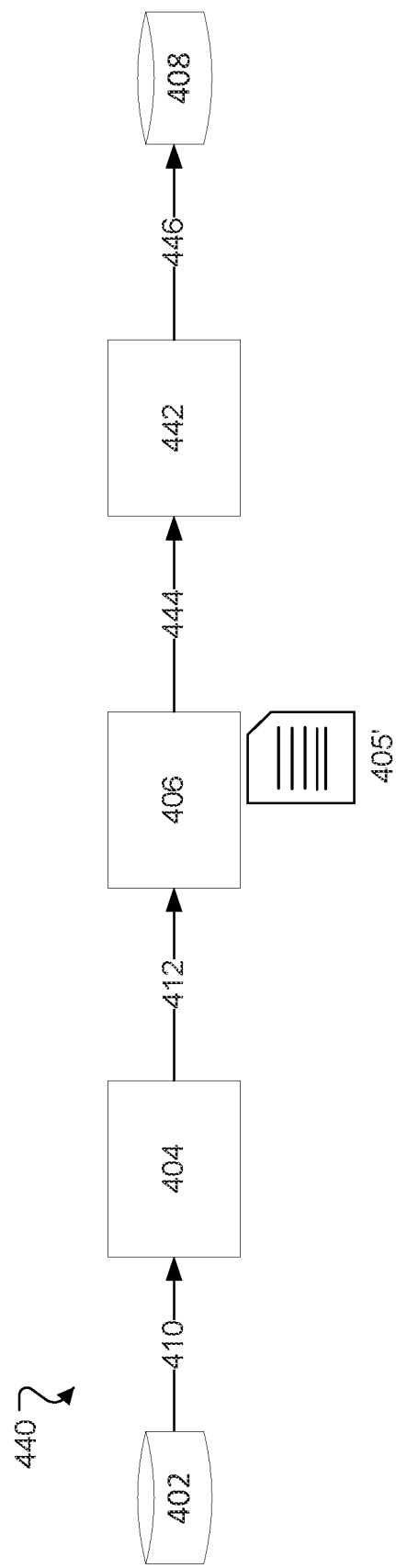

FIGS. 4B and 4C are a source graph 420 and a target graph 440, respectively. A differencing analysis identifies that in the source graph 420, the filter node 406 has been deleted and an additional data source 422 has been added. In the target graph 440, the filter node 406 is associated with a modified parameter set 405' in which the filter by parameter is the transaction date field and an additional sort node 442 has been added.

The set of differences for the source graph 420 includes the following information:
Information indicative of the deleted filter node 406:
An identifier of the filter node 406;
An identifier of the reformat node 404 upstream of the filter node 406 in the base graph 400;
An identifier of the data sink node 408 downstream of the filter node 406 in the base graph;
An identifier of the link 412 between the reformat node 404 and the filter node 406 in the base graph and an indication of the deletion of the link 412;
An identifier of the link 416 between the filter node 406 and the data sink node 408 in the base graph and an indication of the deletion of the link 416; and
An identifier of a new link 424 between the reformat node 404 and the data sink node 408 in the source graph 420.
Information indicative of the new data source node 422:
A specification of the data source node 422;
An identifier of the reformat node 404 downstream of the data source node 422 in the source graph 420; and
An identifier of a new link 426 between the data source node 422 and the reformat node 404 in the source graph 420.

The set of differences for the target graph 440 includes the following information:
Information indicative of the modification of the filter node 406:
An identifier of the filter node 406;
An identifier of the reformat node upstream of the filter node 406 in the target graph 440;
An identifier of the sort node downstream of the filter node 406 in the target graph 440;
An identifier for each of the links 412, 444 connected to the filter node 402; and
A specification of the changed parameter set 405'.
Information indicative of the addition of sort node 442:
A specification of the sort node 442;
A specification of the parameter set for the sort node;
An identifier of the filter node 406 upstream of the sort node 442 in the target graph 440;
An identifier of the data sink node 408 downstream of the sort node 442 in the target graph 440;
An identifier of a new link 444 between the filter node 406 and the sort node 442 in the target graph 440;
An identifier of a new link 446 between the sort node 442 and the data sink 408 in the target graph; and
An identifier of the link 416 between the filter node 406 and the data sink 408 in the base graph and an indication of the deletion of the link 416.

A compatibility analysis determines that the addition of the data source 422 in the source graph 420 is compatible with all differences in the target graph 440, and that the addition of the sort node 442 in the target graph 440 is compatible with all differences in the source graph 420. The information listed above indicative of the addition of the data source 422 and the addition of the sort component 442 is added to a set of combined differences.

The compatibility analysis identifies the deletion of the filter node 406 in the source graph 420 as conflicting with the modification of the parameter set 15 associated with the filter node 406 in the target graph 440. In this example, this conflict is presented to a user on a user interface and the user may, e.g., respond with a selection of the modification of the parameter set. Alternatively, a selection criterion may automatically be applied by the system 300 and may lead to the same selection. The information listed above indicative of the modification of the parameter set is added to the set of combined differences. The information indicative of the deletion of the filter node 406 is not added to the set of combined differences.

Figure 4D:
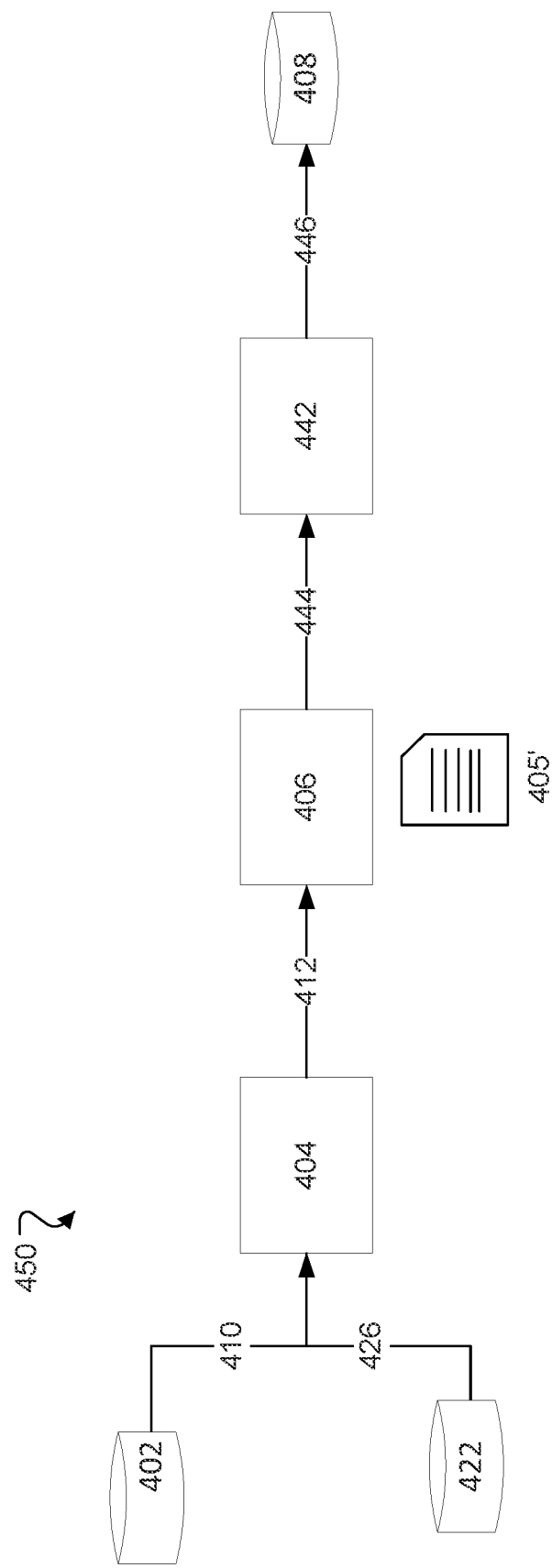

Referring to FIG. 4D, the differences in the set of combined differences are applied to a copy of the base graph 400 to generate an updated graph 450. Specifically, the additions, deletions, and modifications to nodes and links as specified above are applied to the copy of the base graph 400. For instance, to apply the addition of the sort node to the copy of the base graph, the link 416 is deleted, the sort node 442 is added, and the new links 446, 448 are added to connect the sort node to upstream and downstream nodes. Each of the nodes in graph 450 represents a corresponding component and each of the links in graph 450 represent a corresponding flow of data between the components.

Figure 5A:
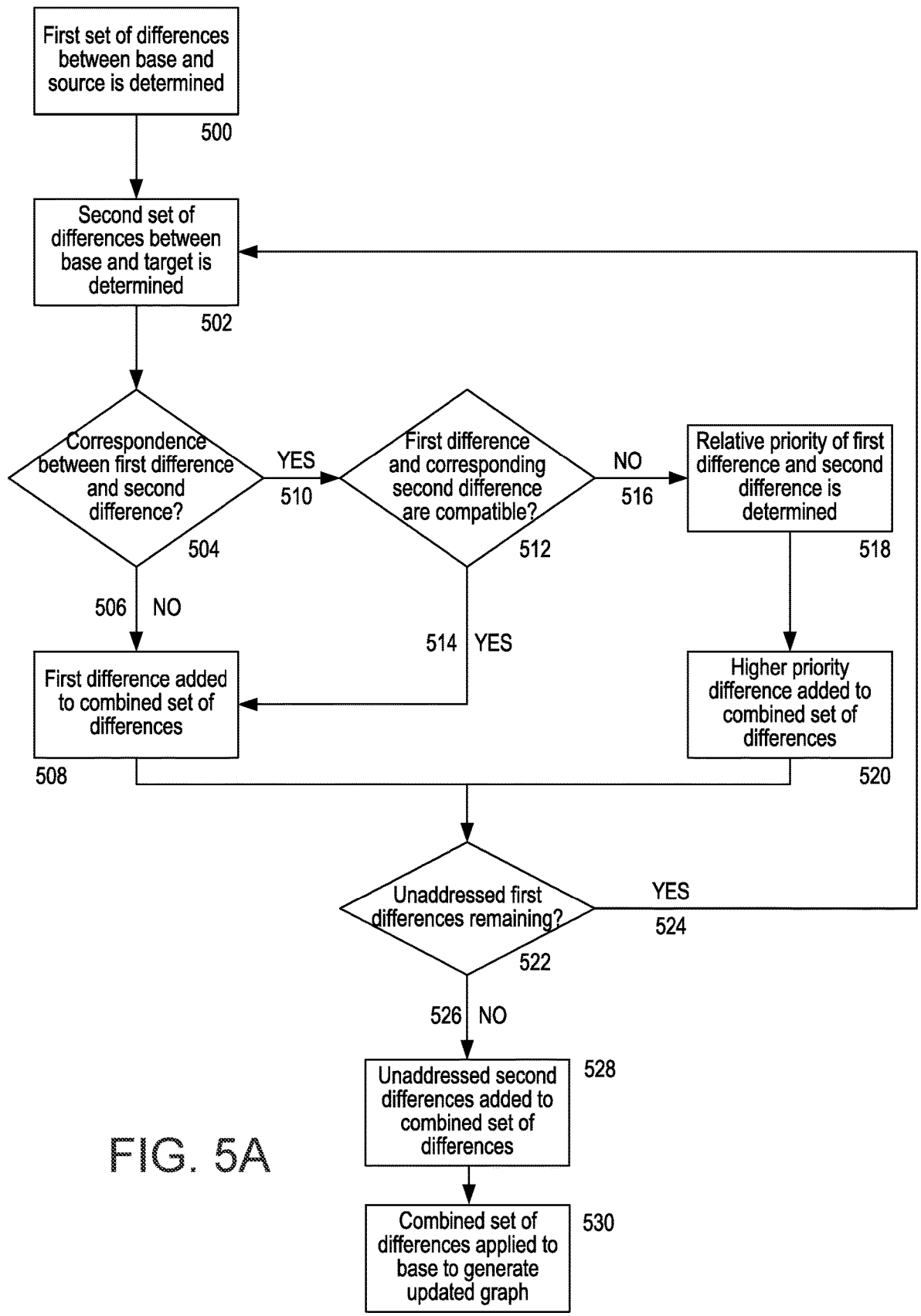
FIGS. 5A and 5B are flow charts.
Figure 5B:
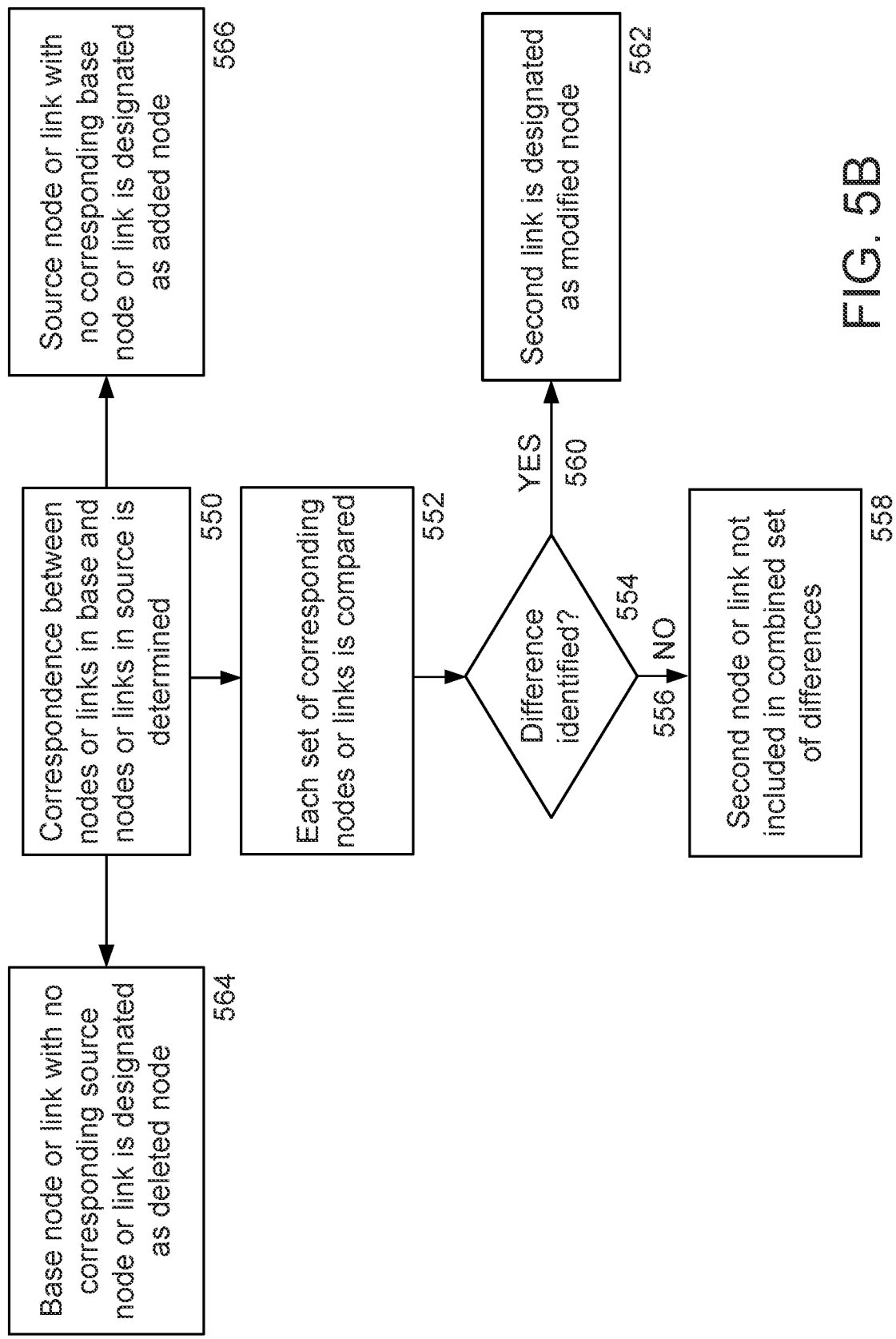

FIG. 5A shows an example process for generating an updated graph based on a base graph and source and target graphs. A first set of differences is determined between the base graph and the source graph (500). Referring to FIG. 5B, to determine the first set of differences, a correspondence is determined between each node or link in the base graph and the nodes or links in the source graph (550). Each first node or link in the base graph that corresponds to a second node or link in the source graph is compared to the corresponding second node or link (552) and any difference between the first node or link and the second node or link is identified (554). If there is no difference between the first node or link and the second node or link (556), the second node or link is not included in the first set of differences (558). If there is a difference between the first node or link and the second node or link (560), the second node or link is designated as a modified node or link in the first set of differences (562). A node or link in the base graph that does not correspond to a node or link in the source graph is designated as a deleted node or link in the first set of differences (564). A node or link in the source graph that does not correspond to a node or link in the base graph is designated as an added node or link in the first set of differences (566).

A second set of differences is determined between the base graph and the target graph (502). To determine the second set of differences, a correspondence is determined between each node or link in the base graph and the nodes or links in the target graph. Each first node or link in the base graph that corresponds to a second node or link in the target graph is compared to the corresponding second node or link and any difference between the first node or link and the second node or link is identified. If there is no difference between the first node or link and the second node or link, the second node or link is not included in the second set of differences. If there is a difference between the first node or link and the second node or link, the second node or link is designated as a modified node or link in the second set of differences. A node or link in the base graph that does not correspond to a node or link in the target graph is designated as a deleted node or link in the second set of differences.

A particular difference in the first set of differences is evaluated to determine a correspondence between the particular difference and a difference in the second set of differences (504). If there is no difference in the second set of differences that corresponds to the particular difference in the first set of differences (506), the particular difference in the first set of differences is added to the set of combined differences (508) and designated as having been addressed. If there is a difference in the second set of differences that corresponds to the particular difference in the first set of differences (510), a compatibility of the particular difference with the corresponding difference in the second set of differences is determined (512). If the differences are determined to be compatible (514), the particular difference in the first set of differences is added to the set of combined differences (508) and both differences are designated as having been addressed. If the differences are determined to be incompatible (516), a relative priority of each of the differences is determined (518), e.g., according to a predefined rule or based on user input. The higher priority difference is added to the set of combined differences (520) and both differences are designated as having been addressed.

The first set of differences is reviewed to determine whether all differences have been addressed (522). If an unaddressed difference remains in the first set of differences (524), another difference in the first set of differences is evaluated (504). If all of the differences in the first set of differences have been addressed (526), any unaddressed differences in the second set of differences are added to the set of combined differences (528). The set of combined differences is applied to the base graph to generate the updated graph (530).

FIGS. 6-9 are screenshots of an example user interface for generating an updated graph from source and target graphs.

Figure 6:
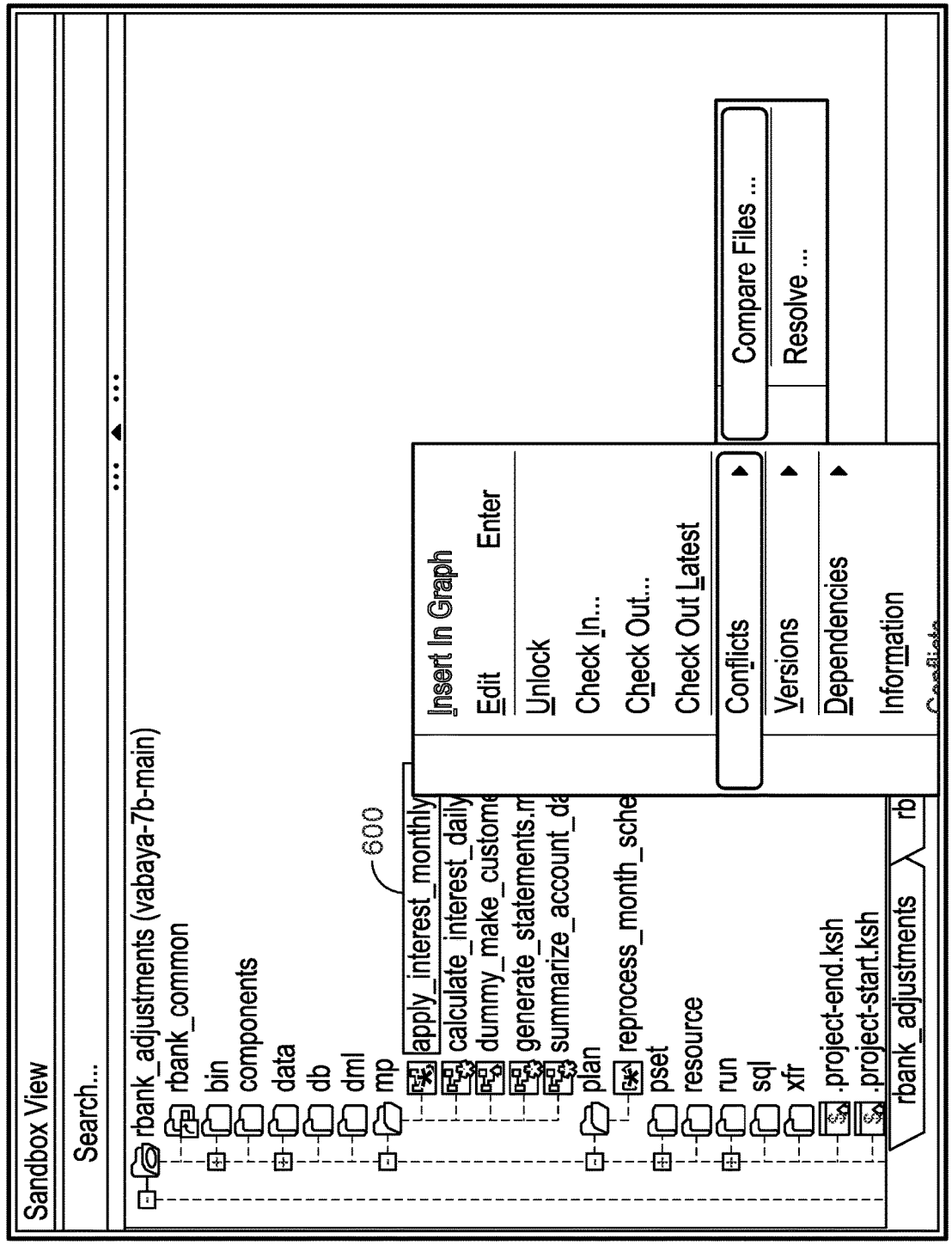
Figure 7:
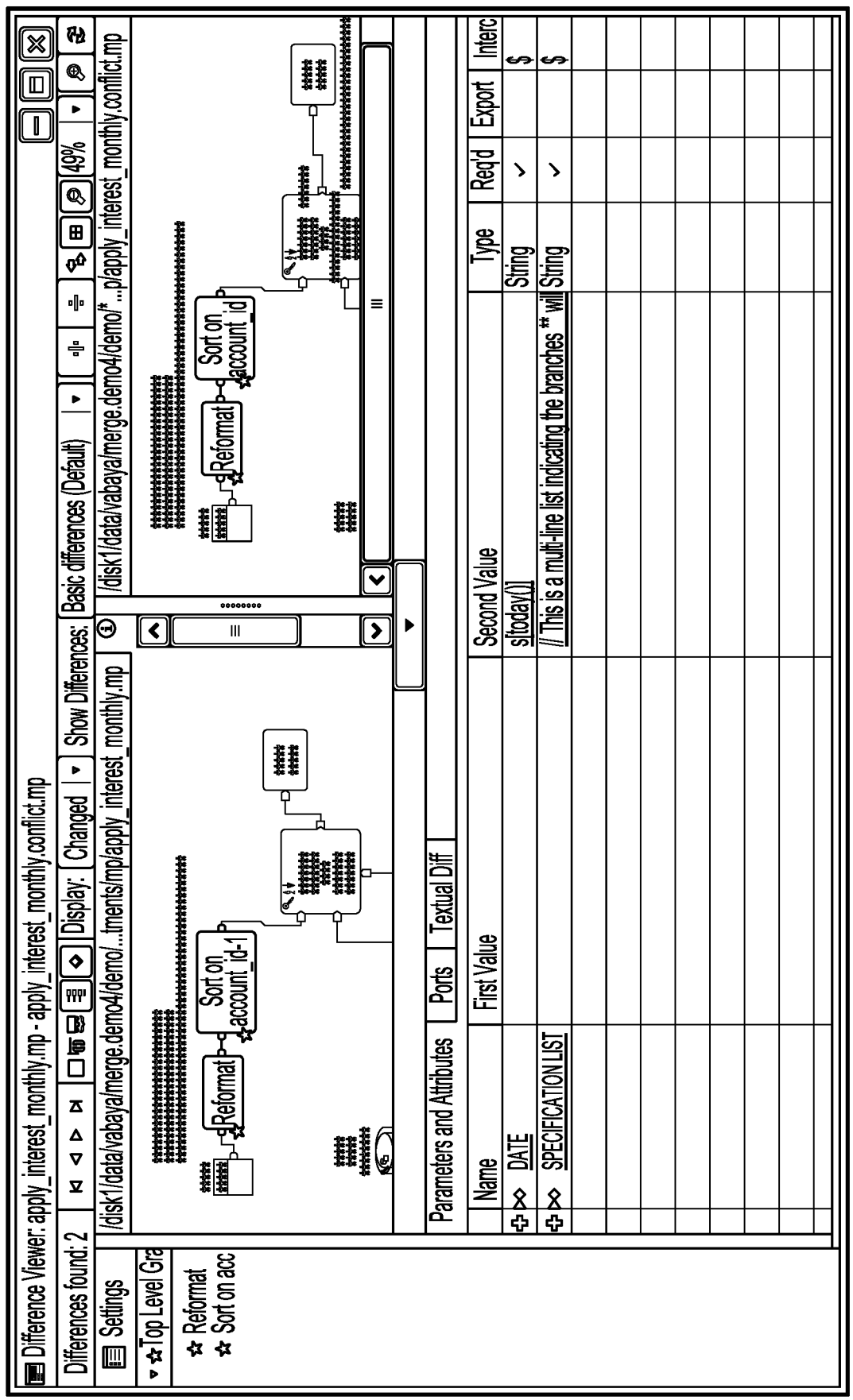

Referring specifically to FIG. 6, a graphical user interface 600 shows a list of updated graphs created by merging differences between a base graph and source and target graphs. Icons can indicate the status of each updated graph, e.g., indicating that the updated graph has no compatibility issues (e.g., as shown for the calculate_interest_daily graph) or has one or more conflicting pairs of differences (e.g., as shown for the apply_interest_monthly graph). The user can select one of the graphs to view information about the graph. For instance, for a graph with one or more conflicting pairs of differences, the user can view a graphical representation of the differences between the base graph and one or more of the source and target graphs. An example of a graphical representation of the differences is shown in FIG. 7.

Referring to FIG. 8, in some examples, the conflicts can be represented in textual format. For instance, in the example of FIG. 8, the source graph includes a "+400.00" value and the target graph includes a "+200.0" value. When conflicts are represented as text, a user can edit the text to leave the desired contents (e.g., to delete the text corresponding to the source graph or the target graph for a given conflict). In some examples, all differences are included in the text and conflicting differences are denoted by a marker, such as sandwiched between "<<<<<<<<<" and ">>>>>>>>>" markers to enable the user to easily locate all conflicts.

Figure 9:
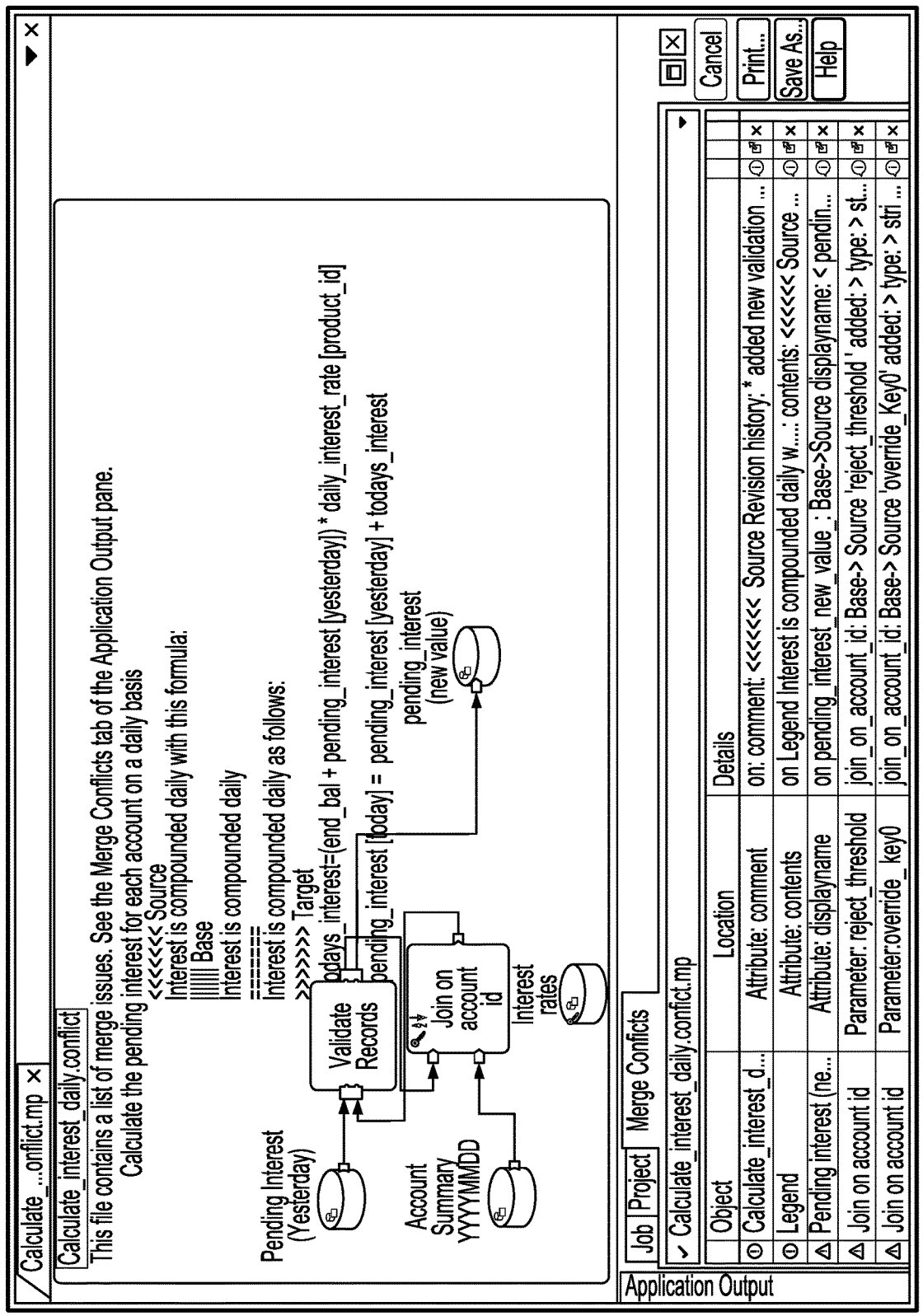

Referring to FIG. 9, in some examples, the conflicts can be represented graphically. To address conflicts, the user can select (e.g., click or tap on) each conflict to access a textual representation of the conflict. In some examples, conflicts can be addressed directly through the graphical representation.

Figure 10:
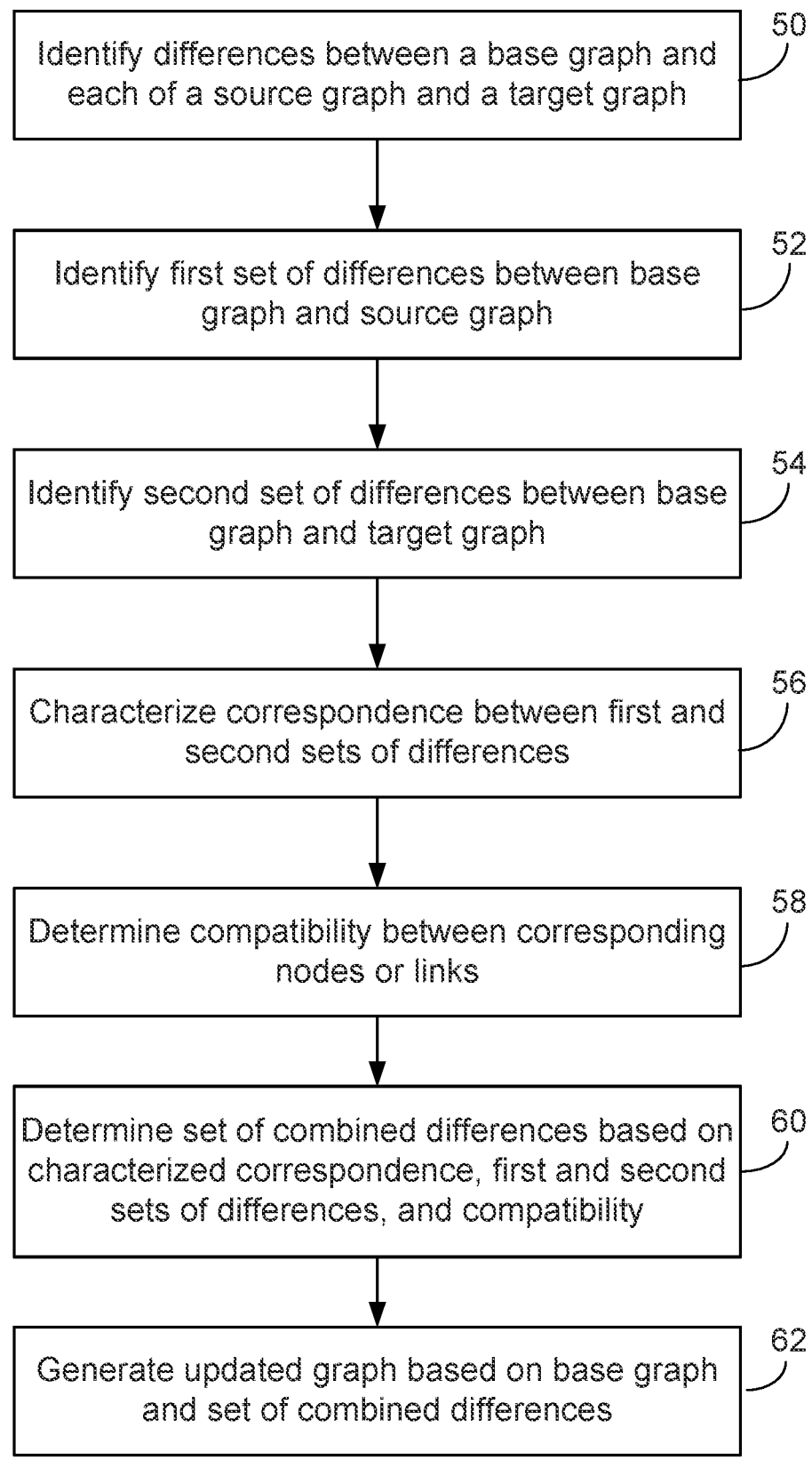
FIG. 10 is a flow chart

FIG. 10 shows a general process for generating an updated graph based on a base graph. Differences between a first dataflow graph and each of a second dataflow graph and a third dataflow graph are identified (50). The first dataflow graph includes a base graph, the second dataflow graph includes a source graph, and the third dataflow graph includes a target graph. The specification of each dataflow graph defines one or more nodes and one or more links connecting nodes. At least one of the nodes represents a data processing component defining an operation to be performed to process data provided to the data processing component. The identification of differences (50) includes comparing a specification of the base graph and a specification of the source graph to identify a first set of differences between the base graph and the source graph (52), e.g., identifying one or more of a first deleted node, a first deleted flow, a first added node, a first added flow, a first modified node, or a first modified flow. The identification of differences (50) also includes comparing a specification of the base graph and a specification of the target graph to identify a second set of differences between the base graph and the target graph (54), e.g., identifying one or more of a second deleted node, a second deleted flow, a second added node, a second added flow, a second modified node, or a second modified flow.

A correspondence between the differences in the first set of differences and the differences in the second set of differences is characterized (56). The characterization includes identifying one or more of (i) a node or link identified in the first set of differences that corresponds to a node or link identified in the second set of differences, (ii) a node or link identified in the first set of differences that does not correspond to any node or link identified in the second set of differences, or (iii) a node or link identified in the second set of differences that does not correspond to any node or link identified in the first set of differences. A compatibility between the node or link identified in the first set of differences and the corresponding node or link identified in the second set of differences is determined (58).

A set of combined differences is determined based on the characterized correspondence, the first set of differences between the base graph and the source graph, and the second set of differences between the base graph and the target graph (60). The set of combined differences can be determined based on the compatibility between the node or link identified in the first set of differences and the corresponding node or link identified in the second set of differences. Included in the set of combined differences can be information indicative of the node or link identified in the first set of differences that does not correspond to any node or link identified in the second set of differences, or information indicative the node or link identified in the second set of differences that does not correspond to any node or link identified in the first set of differences.

The updated dataflow graph is generated based on the base graph and the set of combined differences (62).

In some examples, a component of a graph can be implemented using a set of other components that are themselves interconnected with flows. This set of components through which a component of a graph is implemented is referred to as a subgraph, and is a node of the graph. The approaches described here can be used to merge differences between graphs including subgraphs.

A plan is a visual representation of a process that involves the execution of multiple graphs. In a plan, the individual graphs are the nodes and are interconnected by flows indicative of the flow of data among the graphs of the plan.

Figure 11:
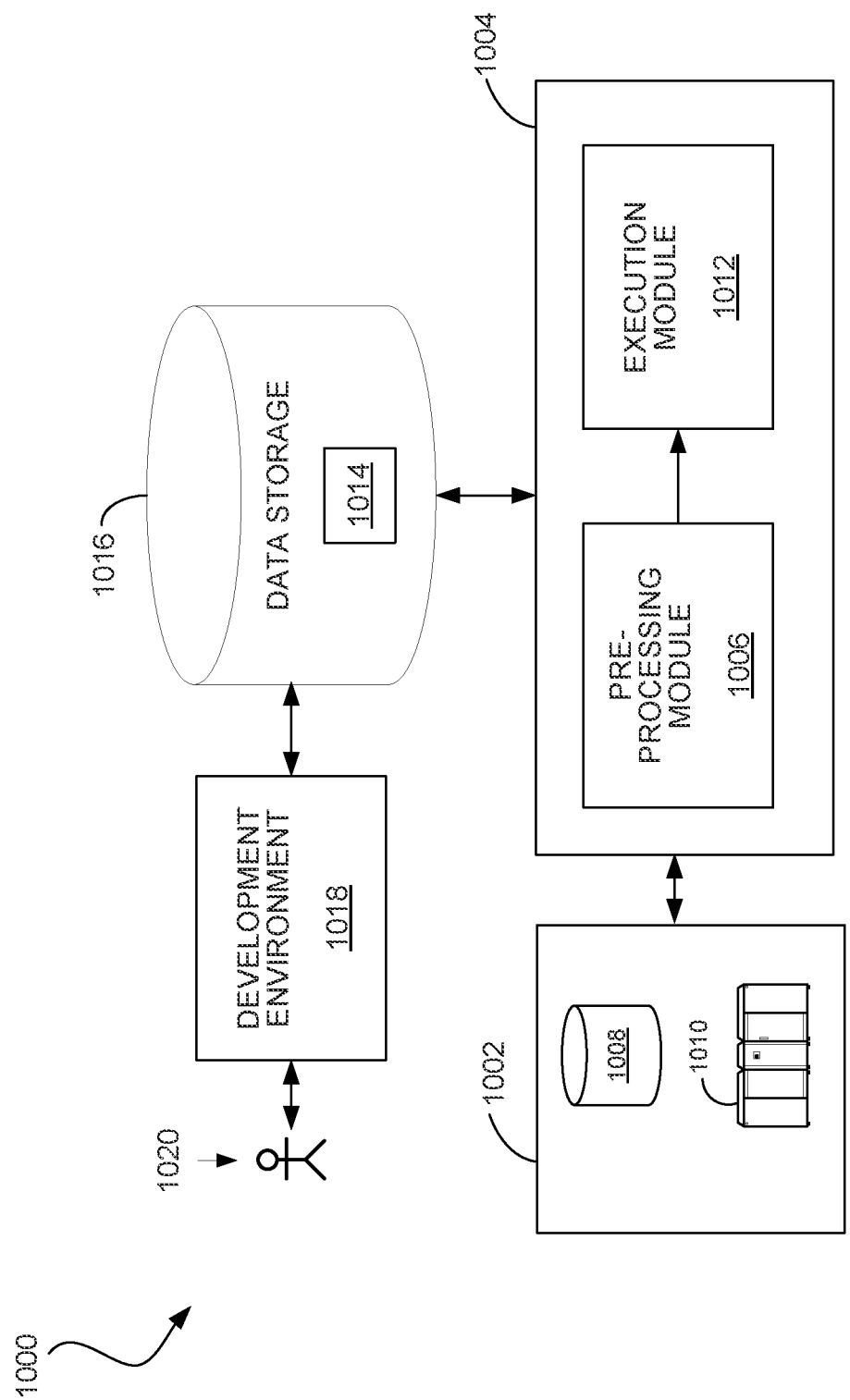
FIG. 11 is a diagram of a data processing system for developing dataflow graphs.

FIG. 11 shows an example of a data processing system 1000 for developing and dataflow graphs in which the techniques described here can be used. In some instances, the data processing system 1000 can also be for executing executable dataflow graphs. The system 1000 includes a data source 1002 that may include one or more sources of data such as storage devices or connections to online data streams, each of which may store or provide data in any of a variety of formats (e.g., database tables, spreadsheet files, flat text files, or a native format used by a mainframe computer). The data may be logistical data, analytic data or industrial machine data. An execution environment or runtime environment 1004 includes a pre-processing module 1006 and an execution module 1012. The execution environment 1004 may be hosted, for example, on one or more general-purpose computers under the control of a suitable operating system, such as a version of the UNIX operating system. For example, the execution environment 1004 can include a multiple-node parallel computing environment including a configuration of computer systems using multiple processing units (such as central processing units, CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

Storage devices providing the data source 1002 may be local to the execution environment 1004, for example, being stored on a storage medium (e.g., hard drive 1008) connected to a computer hosting the execution environment 1004, or may be remote to the execution environment 1004, for example, being hosted on a remote system (e.g., mainframe computer 1010) in communication with a computer hosting the execution environment 1004, over a remote connection (e.g., provided by a cloud computing infrastructure).

The pre-processing module 1006 reads data from the data source 1002 and prepares data processing applications (e.g. an executable dataflow graph) for execution. For instance, the pre-processing module 1006 can compile the data processing application, store and/or load a compiled data processing application to and/or from a data storage system 1016 accessible to the execution environment 1004, and perform other tasks to prepare a data processing application for execution.

The execution module 1012 executes the data processing application prepared by the pre-processing module 1006 to process a set of data and generate output data 1014 that results from the processing. The output data 1014 may be stored back in the data source 1002 or in a data storage system 1016 accessible to the execution environment 1004, or otherwise used. The data storage system 1016 is also accessible to an optional development environment 1018 in which a developer 1020 is able to design and edit the data processing applications to be executed by the execution module 1012. The development environment 1018 is, in some implementations, a system for developing applications as dataflow graphs that include vertices (representing data processing components or datasets) connected by directed links (representing flows of work elements, i.e., data) between the vertices. For example, such an environment is described in more detail in U.S. Patent Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," the contents of which are incorporated herein by reference in their entirety. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

The pre-processing module 1006 can receive data from a variety of types of systems that may embody the data source 1002, including different forms of database systems. The data may be organized as records having values for respective fields (also called "attributes" or "columns"), including possibly null values. When first reading data from a data source, the pre-processing module 1006 typically starts with some initial format information about records in that data source. In some circumstances, the record structure of the data source may not be known initially and may instead be determined after analysis of the data source or the data. The initial information about records can include, for example, the number of bits that represent a distinct value, the order of fields within a record, and the type of value (e.g., string, signed/unsigned integer) represented by the bits.

In other words, and generally applicable to executable dataflow graphs described herein, the executable dataflow graph implements a graph-based computation performed on data flowing from one or more input data sets of a data source 1002 through the data processing components to one or more output data sets, wherein the dataflow graph is specified by data structures in the data storage 1014, the dataflow graph having the nodes that are specified by the data structures and representing the data processing components connected by the one or more links, the links being specified by the data structures and representing data flows between the data processing components. The execution environment or runtime environment 1004 is coupled to the data storage 1014 and is hosted on one or more computers, the runtime environment 1004 including the pre-processing module 1006 configured to read the stored data structures specifying the dataflow graph and to allocate and configure computing resources (e.g. processes, memory, CPUs etc.) for performing the computation of the data processing components that are assigned to the dataflow graph by the pre-processing module 1006, the runtime environment 1004 including the execution module 1012 to schedule and control execution of the computation of the data processing components. In other words, the runtime or execution environment 1004 hosted on one or more computers is configured to read data from the data source 1002 and to process the data using an executable computer program expressed in form of the dataflow graph.

The approaches described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of graphs. The modules of the program (e.g., elements of a graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for generating an updated dataflow graph based on a first dataflow graph, in which each of the first dataflow graph and the updated dataflow graph is configured to process data in one or more fields of data records having a record format, the method including:
   identifying (i) a first set of differences between a first dataflow graph and a second dataflow graph and (ii) a second set of differences between the first dataflow graph and a third dataflow graph,
      wherein the specification of each of the dataflow graphs defines nodes, at least one of the nodes representing a data processing component defining an operation to be performed to process data in one or more fields of data records having a record format, the data records being provided to the data processing component, and one or more links connecting the nodes and each representing a flow of data records, and
      wherein the identifying includes:
         comparing a specification of the first dataflow graph and a specification of the second dataflow graph to identify the first set of differences between the first dataflow graph and the second dataflow graph, the first set of differences including information indicative of one or more of a first deleted node, a first deleted link, a first added node, a first added link, a first modified node, or a first modified link, and
         comparing a specification of the first dataflow graph and a specification of the third dataflow graph to identify the second set of differences between the first dataflow graph and the third dataflow graph, the second set of differences including information indicative of one or more of a second deleted node, a second deleted link, a second added node, a second added link, a second modified node, or a second modified link;
   determining a set of combined differences based on the first set of differences and the second set of differences;
   generating the updated dataflow graph based on the first dataflow graph and the set of combined differences, including generating a specification of the updated dataflow graph that defines nodes, at least one of the nodes representing a data processing component defining an operation to be performed to process data in one or more fields of data records having a record format, the data records being provided to the data processing component, and that defines one or more links connecting the nodes and each representing a flow of data records; and
   executing the updated dataflow graph to process data in one or more fields of input data records received from a data source external to the updated dataflow graph, the executing including:
      receiving input data records into an input port of a first node of the updated dataflow graph, wherein the first node represents a first data processing component defining a first operation;
      processing the data in the one or more fields of the input data records according to the first operation defined by the first data processing component; and
      outputting output data records based on the processing, the output data records including one or more fields containing output data, including outputting the output data records onto a link connected to an output port of the first node, wherein the link is connected either to an input port of a second node of the updated dataflow graph or to a data destination external to the updated dataflow graph.

2. The method of claim 1, including determining the set of combined differences based on a correspondence between the first set of differences and the second set of differences.

3. The method of claim 1, including determining the set of combined differences based on user input.

4. The method of claim 1, in which generating the set of combined differences includes including, in the set of combined differences, information indicative of a node or link identified in the first set of differences that does not correspond to any node or link identified in the second set of differences, information indicative of a node or link identified in the second set of differences that does not correspond to any node or link identified in the first set of differences, or both.

5. The method of claim 1, in which determining the set of combined differences includes determining a compatibility between the node or link identified in the first set of differences and the corresponding node or link identified in the second set of differences.

6. The method of claim 1, in which determining the set of combined differences includes:
    determining that a first difference in the first set of differences conflicts with a second difference in the second set of differences;
    selecting one of the first or second differences; and
    including information indicative of the selected difference in the set of combined differences.

7. The method of claim 6, including selecting one of the differences based on a selection criterion.

8. The method of claim 6, including:
    presenting, on a user interface, information indicative of the conflicting differences in the first set, the differences in the second set, or both; and
    selecting the one of the differences based on user input.

9. The method of claim 1, in which generating the updated dataflow graph includes:
    generating a copy of the base graph; and
    applying each difference in the set of combined differences to the copy.

10. The method of claim 1, in which comparing a specification of the base graph and a specification of the source graph includes determining a correspondence between the base graph and the source graph.

11. The method of claim 1, in which the base graph contains a base subgraph and in which the source graph contains a first subgraph, and including:
    comparing a specification of the base subgraph and a specification of the first subgraph to identify one or more differences between the base subgraph and the first subgraph.

12. A non-transitory computer readable medium storing instructions for causing a computing system to generate an updated dataflow graph based on a first dataflow graph, in which each of the first dataflow graph and the updated dataflow graph is configured to process data in one or more fields of data records having a record format, the instructions causing the computing system to:
    identify (i) a first set of differences between a first dataflow graph and a second dataflow graph and (ii) a second set of differences between the first dataflow graph and a third dataflow graph,
        wherein the specification of each of the dataflow graphs defines nodes, at least one of the nodes representing a data processing component defining an operation to be performed to process data in one or more fields of data records having a record format, the data records being provided to the data processing component, and one or more links connecting the nodes and each representing a flow of data records, and
        wherein the identifying includes:
            comparing a specification of the first dataflow graph and a specification of the second dataflow graph to identify the first set of differences between the first dataflow graph and the second dataflow graph, the first set of differences including information indicative of one or more of a first deleted node, a first deleted link, a first added node, a first added link, a first modified node, or a first modified link, and
            comparing a specification of the first dataflow graph and a specification of the third dataflow graph to identify the second set of differences between the first dataflow graph and the third dataflow graph, the second set of differences including information indicative of one or more of a second deleted node, a second deleted link, a second added node, a second added link, a second modified node, or a second modified link;
    determine a set of combined differences based on the first set of differences and the second set of differences;
    generate the updated dataflow graph based on the first dataflow graph and the set of combined differences, including generating a specification of the updated dataflow graph that defines nodes, at least one of the nodes representing a data processing component defining an operation to be performed to process data in one or more fields of data records having a record format, the data records being provided to the data processing component, and that defines one or more links connecting the nodes and each representing a flow of data records; and
    execute the updated dataflow graph to process data in one or more fields of input data records received from a data source external to the updated dataflow graph, the executing including:
        receiving input data records into an input port of a first node of the updated dataflow graph, wherein the first node represents a first data processing component defining a first operation;
        processing the data in the one or more fields of the input data records according to the first operation defined by the first data processing component; and
        outputting output data records based on the processing, the output data records including one or more fields containing output data, including outputting the output data records onto a link connected to an output port of the first node, wherein the link is connected either to an input port of a second node of the updated dataflow graph or to a data destination external to the updated dataflow graph.

13. The non-transitory computer readable medium of claim 12, the instructions causing the computing system to determine the set of combined differences based on a correspondence between the first set of differences and the second set of differences.

14. The non-transitory computer readable medium of claim 12, the instructions causing the computing system to determine the set of combined differences based on user input.

15. The non-transitory computer readable medium of claim 12, in which generating the set of combined differences includes including, in the set of combined differences, information indicative of a node or link identified in the first set of differences that does not correspond to any node or link identified in the second set of differences, information indicative of a node or link identified in the second set of differences that does not correspond to any node or link identified in the first set of differences, or both.

16. The non-transitory computer readable medium of claim 12, in which determining the set of combined differences includes determining a compatibility between the node or link identified in the first set of differences and the corresponding node or link identified in the second set of differences.

17. The non-transitory computer readable medium of claim 12, in which determining the set of combined differences includes:
    determining that a first difference in the first set of differences conflicts with a second difference in the second set of differences;
    selecting one of the first or second differences; and
    including information indicative of the selected difference in the set of combined differences.

18. The non-transitory computer readable medium of claim 17, the instructions causing the computing system to select one of the differences based on a selection criterion.

19. The non-transitory computer readable medium of claim 17, the instructions causing the computing system to:
    present, on a user interface, information indicative of the conflicting differences in the first set, the differences in the second set, or both; and
    select the one of the differences based on user input.

20. The non-transitory computer readable medium of claim 12, in which generating the updated dataflow graph includes:
    generating a copy of the base graph; and
    applying each difference in the set of combined differences to the copy.

21. The non-transitory computer readable medium of claim 12, in which comparing a specification of the base graph and a specification of the source graph includes determining a correspondence between the base graph and the source graph.

22. The non-transitory computer readable medium of claim 12, in which the base graph contains a base subgraph and in which the source graph contains a first subgraph, and including:
    comparing a specification of the base subgraph and a specification of the first subgraph to identify one or more differences between the base subgraph and the first subgraph.

23. A computing system for generating an updated dataflow graph based on a first dataflow graph, in which each of the first dataflow graph and the updated dataflow graph is configured to process data in one or more fields of data records having a record format, the computing system including:
    one or more processors and memory configured to:
        identify (i) a first set of differences between a first dataflow graph and a second dataflow graph and (ii) a second set of differences between the first dataflow graph and a third dataflow graph,
            wherein the specification of each of the dataflow graphs defines nodes, at least one of the nodes representing a data processing component defining an operation to be performed to process data in one or more fields of data records having a record format, the data records being provided to the data processing component, and one or more links connecting the nodes and each representing a flow of data records, and
            wherein the identifying includes:
                comparing a specification of the first dataflow graph and a specification of the second dataflow graph to identify the first set of differences between the first dataflow graph and the second dataflow graph, the first set of differences including information indicative of one or more of a first deleted node, a first deleted link, a first added node, a first added link, a first modified node, or a first modified link, and
                comparing a specification of the first dataflow graph and a specification of the third dataflow graph to identify the second set of differences between the first dataflow graph and the third dataflow graph, the second set of differences including information indicative of one or more of a second deleted node, a second deleted link, a second added node, a second added link, a second modified node, or a second modified link;
        determine a set of combined differences based on the first set of differences and the second set of differences;
        generate the updated dataflow graph based on the first dataflow graph and the set of combined differences, including generating a specification of the updated dataflow graph that defines nodes, at least one of the nodes representing a data processing component defining an operation to be performed to process data in one or more fields of data records having a record format, the data records being provided to the data processing component, and that defines one or more links connecting the nodes and each representing a flow of data records; and
        execute the updated dataflow graph to process data in one or more fields of input data records received from a data source external to the updated dataflow graph, the executing including:
            receiving input data records into an input port of a first node of the updated dataflow graph, wherein the first node represents a first data processing component defining a first operation;
            processing the data in the one or more fields of the input data records according to the first operation defined by the first data processing component; and
            outputting output data records based on the processing, the output data records including one or more fields containing output data, including outputting the output data records onto a link connected to an output port of the first node, wherein the link is connected either to an input port of a second node of the updated dataflow graph or to a data destination external to the updated dataflow graph.

* * * * *